US 9,780,909 B2

(12) United States Patent
Wood et al.

(10) Patent No.: US 9,780,909 B2
(45) Date of Patent: Oct. 3, 2017

(54) NETWORK TOPOLOGY OPTIMIZATION WITH FEASIBLE OPTICAL PATHS

(71) Applicant: Juniper Networks, Inc., Sunnyvale, CA (US)

(72) Inventors: David C. Wood, Woodbridge (GB); Massimiliano Salsi, San Jose, CA (US); Steven B. Alleston, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 58 days.

(21) Appl. No.: 14/788,602

(22) Filed: Jun. 30, 2015

(65) Prior Publication Data

US 2016/0191194 A1 Jun. 30, 2016

Related U.S. Application Data

(63) Continuation-in-part of application No. 14/586,464, filed on Dec. 30, 2014, now Pat. No. 9,602,387.
(Continued)

(51) Int. Cl.
*H04J 14/02* (2006.01)
*H04B 10/27* (2013.01)
*H04L 12/24* (2006.01)

(52) U.S. Cl.
CPC ........ *H04J 14/0286* (2013.01); *H04B 10/27* (2013.01); *H04J 14/0267* (2013.01); *H04L 41/0896* (2013.01); *H04L 41/12* (2013.01); *H04J 2203/0055* (2013.01); *H04J 2203/0098* (2013.01); *H04L 41/14* (2013.01)

(58) Field of Classification Search
CPC .............. H04J 14/0286; H04J 14/0267; H04J 2203/0055; H04J 2203/0098; H04B 10/27

USPC ............... 370/232, 238, 254, 255, 256, 390; 398/49, 58, 79; 709/221, 223, 241
See application file for complete search history.

(56) References Cited

U.S. PATENT DOCUMENTS 6,778,531 B1 8/2004 Kodialam et al.
7,715,369 B1 5/2010 Wang et al.
(Continued)

FOREIGN PATENT DOCUMENTS

IT WO 2013091688 A1 * 6/2013 ........... H04L 41/145
WO 2013091688 A1 6/2013
WO 2013184846 A1 12/2013

OTHER PUBLICATIONS

Extended Search Report from counterpart European Application No. 15201555.8, dated Feb. 25, 2016, 10 pp.
(Continued)

*Primary Examiner* — Charles C Jiang
*Assistant Examiner* — Wali Butt
(74) *Attorney, Agent, or Firm* — Shumaker & Sieffert, P.A.

(57) ABSTRACT

In general, techniques are described for dynamically determining a logical network topology for more efficiently transporting network traffic over a physical topology based on end-to-end network traffic demands and optical transport network (OTN) characteristics of the network. The techniques may be applicable to meeting network traffic demands placed upon a multi-layer network having a base transport layer and a logical or overlay Internet Protocol (IP) layer routed on the transport layer.

34 Claims, 15 Drawing Sheets

Related U.S. Application Data which is a continuation-in-part of application No. 14/585,170, filed on Dec. 29, 2014.

(56) References Cited

U.S. PATENT DOCUMENTS

| | | |
|---|---|---|
| 9,369,338 B1 | 6/2016 | Krishnaswamy et al. |
| 2004/0083277 A1 | 4/2004 | Chaporkar et al. |
| 2011/0188852 A1 | 8/2011 | Stodola et al. |
| 2012/0213224 A1 | 8/2012 | Chen |
| 2013/0252653 A1 | 9/2013 | Aragon |
| 2014/0099119 A1* | 4/2014 | Wei .................. H04J 14/0257 398/79 |
| 2014/0119181 A1 | 5/2014 | Jain et al. |
| 2014/0204794 A1* | 7/2014 | El-Najjar ............. H04W 16/18 370/254 |
| 2015/0003283 A1 | 1/2015 | Previdi et al. |
| 2016/0087849 A1* | 3/2016 | Balasubramanian ... H04L 41/12 709/221 |

OTHER PUBLICATIONS

Lee et al., "A Survey of Multipath Routing for Traffic Engineering," Information and Communications University (ICU), Jan. 2002, 27 pp.

Kodialam et al., "Dynamic Routing of Bandwidth Guaranteed Multicasts with Failure Backup," Proceedings of the 10th International Conference on Network Protocols (ICNP'02), Nov. 12-15, 2002, 10 pp.

Donoso et al., "A Multi-Objective Optimization Scheme for Multicast Routing: A Multitree Approach," Telecommunications Systems, vol. 27 Issue 2-4, Oct. 2004, 23 pp.

Din, "Genetic Algorithm for Finding Minimal Cost Light-forest of Multicast Routing on WDM Networks," Artificial Intelligence Review, vol. 29 No. 3-4, Nov. 1, 2009, pp. 195-222.

Razo et al., "The PlaNet-PTN Module: A Single Layer Design Tool for Packet Transport Networks," Computer Aided Modeling and Design of Communication Links and Networks, Jun. 12, 2009, 5 pp.

Extended Search Report from counterpart European Application No. 15201589.7, dated Feb. 25, 2016, 10 pp.

Johnston et al., "A Robust Optimization Approach to Backup Network Design with Random Failures," IEEE/ACM Transactions on Networking, Aug. 2015, pp. 1216-1228.

Extended Search Report from counterpart European Application No. 15201579.8, dated Feb. 26, 2016, 10 pp.

"Juniper Adva Packet Optical Convergence: Reducing Total Cost of Ownership in De-layered Networks," Juniper Networks, Inc., Whitepaper, Sep. 2014, 18 pp.

Andersson et al.. "LDP Specification," Network Working Group, RFC 3036, Standards Track, Jan. 2001, 133 pp.

Bousser et al., "Multilayer Design to Achieve Reliable and Resource Efficient Super-Core Networks," Abstract, WANDL Inc., MPLS Ethernet World Congress, Mar. 2013, 1 pp.

U.S. Appl. No. 14/042,614, by Nitin Bahadur, filed Sep. 30, 2013.

U.S. Appl. No. 14/500,736, by David Wood, filed Sep. 29, 2014.

U.S. Appl. No. 14/585,170, by David Wood, filed Dec. 29, 2014.

U.S. Appl. No. 14/586,464, by David Wood, filed Dec. 30, 2014.

Wood et al., "Multilayer IP-over-Transport Network Design," May 2012, 29 pp.

Office Action from U.S. Appl. No. 14/586,464, dated Jul. 12, 2016, 33 pp.

Amendment in Response to Office Action mailed Jul. 12, 2016, from U.S. Appl. No. 14/586,464, filed Oct. 12, 2016, 11 pp.

Response to Office Action dated Dec. 1, 2016, from U.S. Appl. No. 14/585,170, filed Mar. 1, 2017, 12 pp.

Notice of Allowance from U.S. Appl. No. 14/585,170, dated Mar. 21, 2017, 5 pp.

Office Action from U.S. Appl. No. 14/585,170, dated Dec. 1, 2016, 34 pp.

Notice of Allowance from U.S. Appl. No. 14/586,464, mailed Nov. 7, 2016, 7 pp.

Response to Communication pursuant to 69 EPC dated Jul. 11, 2016, from counterpart European Application No. 15201555.8, filed Jan. 3, 2017, 7 pp.

Response to Communication pursuant to 69 EPC dated Jul. 11, 2016, from counterpart European Application No. 15201579.8, filed Jan. 4, 2017, 7 pp.

Response to Communication pursuant to 69 EPC dated Jul. 11, 2016, from counterpart European Application No. 15201589.7, filed Jan. 4, 2017, 9 pp.

* cited by examiner

| | PMD | PDL | CD | OSNR |
|---|---|---|---|---|
| 709 | 0 | 0 | 0 | V1 |
| 710 | 0 | 0 | 0 | V2 |
| 711 | 0 | 0 | 0 | V3 |
| 704D | 0 | 0 | 0 | V4 |
| 704E | 0 | 0 | 0 | V5 |
| 714 | P1 | P3 | C1 | V6 |
| 714B | P2 | P4 | C2 | V7 |

NETWORK TOPOLOGY OPTIMIZATION WITH FEASIBLE OPTICAL PATHS

This application is a continuation-in-part of U.S. patent application Ser. No. 14/586,464, filed Dec. 30, 2014, which is a continuation-in-part of application Ser. No. 14/585,170, filed Dec. 29, 2014, each of which is incorporated herein by reference in its entirety.

TECHNICAL FIELD

The disclosure relates to computer networks and, more specifically, to determining a computer network topology.

BACKGROUND

Routing devices within a network, often referred to as routers, maintain tables of routing information that describe available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

The term "link" is often used to refer to the connection between two devices on a network. The link may be a physical connection such as a copper wire, a coaxial cable, any of a host of different fibre optic lines or a wireless connection. In addition, network devices may define "virtual" or "logical" links, and map the virtual links to the physical links. In other words, the use of virtual links provides a degree of abstraction. As networks grow in size and complexity, the traffic on any given link may approach a maximum bandwidth capacity for the link, thereby leading to congestion and loss.

SUMMARY

In general, techniques are described for dynamically determining a logical network topology for more efficiently transporting network traffic over a physical topology based on end-to-end network traffic demands and optical transport network (OTN) characteristics of the network. The techniques may be applicable to meeting network traffic demands placed upon a multi-layer network having a base transport layer and a logical or overlay Internet Protocol (IP) layer routed on the transport layer.

In some examples, a management device for a multi-layer network determines a logical network topology for transporting a traffic demand matrix. The logical network topology is determined to ensure sufficient capacity in the event of a failure of any base layer component and to facilitate an optimized total resource cost to the network for transporting the traffic. To determine the logical network topology, the management device obtains abstract link data describing a set of candidate links available for use as links in the network topology. The management device may also obtain abstract link data describing the shared-risks encountered by these candidate links on their physical (transport) paths, as well as information relevant to path optimization such as the physical length or delay of the link in some cases. The management device may also determine characteristics of optical transport network equipment, such as cross-connects, wavelength-division multiplexing (WDM)/dense WDM (DWDM) multiplexers and demultiplexers, inline amplifiers, fibre links, etc., in order to determine whether optical paths for the candidate links are feasible for optical transport. That is, the management device may determine whether, for a given candidate link that traverses an optical path having one or more fibre links and assorted optical equipment, the optical path meets the optical constraints of the device (e.g., the optical receiver) for converting the optical signal to an electrical signal for routing. If the optical path for a candidate link is feasible, the management device includes the candidate link in a set of filtered candidate links.

The management device iteratively analyzes the filtered candidate links and abstract link data in view of the traffic demand matrix to select a subset of the filtered candidate links to efficiently and robustly carry the demands. In some examples, the management device is a controller that actively manages and provisions the multi-layer network with the selected subset of the filtered candidate links. In such examples, for instance, as part of its design output, the management device may signal to the network (or the network operator) the information required to configure and activate any of these selected subset of filtered candidate links that are not already activated and configured. In some examples, the management device is a network management system that facilitates design decisions regarding the network's operation and performance by network planners, designers, engineers, and operators. In such examples, the management device may output a representation of the selected subset of filtered candidate links, e.g., as a recommended topology or as a description of topology solution determined by the management device. The representation may be usable for determining whether sufficient capacity exists or whether additional capacity should be added, identifying those links that may be pruned without compromising resiliency requirements, modeling the network, identifying and preventing potential bottlenecks, validating changes prior to deployment, performing traffic load analysis, and so forth.

The techniques may provide one or more advantages. For example, a management device that applies the above-described techniques may facilitate, with each iteration, movement toward global optimization along a total cost of solutions gradient for a traffic demand matrix with respect to a total cost to the network using filtered candidate links having feasible optical paths. While the globally-optimal solution may not be reached in all cases, the techniques may avoid at least some local minima on the total cost of solutions gradient, which may result in robust yet lower resource cost solutions.

In one example, a method comprises obtaining, by a management device of a multi-layer network comprising a network layer and an underlying transport layer, a plurality of candidate links, wherein each candidate link of the plurality of candidate links is associated with an optical path in the transport layer; determining, by the management device based at least on optical network data that describes optical characteristics of fibre links of the transport layer, each candidate link of the plurality of candidate links that has a feasible optical path; determining, by the management device, a plurality of filtered candidate links comprising each candidate link determined to have a feasible optical path; determining, by the management device, a first solution comprising a network topology for the network layer that includes a first selected subset of the filtered candidate links; determining, by the management device after generating a modified network topology based at least on the network topology, a second solution comprising the modified network topology for the network layer that includes a second selected subset of the filtered candidate links; and outputting, by the management device, topology data for one of the first solution or the second solution having a lowest total cost, the lowest total cost including a total resource cost to the network for the one of the first solution or the second solution.

In another example, a management device for a multi-layer network comprising a network layer and an underlying transport layer comprises one or more processors coupled to a memory; and a topology computation module configured for execution by the one or more processors to obtain a plurality of candidate links, wherein each candidate link of the plurality of candidate links is associated with an optical path in the transport layer; determine, based at least on optical network data that describes optical characteristics of fibre links of the transport layer, each candidate link of the plurality of candidate links that has a feasible optical path; determine a plurality of filtered candidate links comprising each candidate link determined to have a feasible optical path; determine a first solution comprising a network topology for the network layer that includes a first selected subset of the filtered candidate links; and determine, after generating a modified network topology based at least on the network topology, a second solution comprising the modified network topology for the network layer that includes a second selected subset of the filtered candidate links, wherein the one or more processors are configured to output, for configuring the multi-layer network, topology data for one of the first solution or the second solution having a lowest total cost, the lowest total cost including a total resource cost to the network for the one of the first solution or the second solution.

In another example, a non-transitory computer-readable medium contains instructions for causing one or more programmable processors of a management device of a multi-layer network comprising a network layer and an underlying transport layer to perform operations comprising obtaining a plurality of candidate links, wherein each candidate link of the plurality of candidate links is associated with an optical path in the transport layer; determining, based at least on optical network data that describes optical characteristics of fibre links of the transport layer, each candidate link of the plurality of candidate links that has a feasible optical path; determining a plurality of filtered candidate links comprising each candidate link determined to have a feasible optical path; determining a first solution comprising a network topology for the network layer that includes a first selected subset of the filtered candidate links; determining, after generating a modified network topology based at least on the network topology, a second solution comprising the modified network topology for the network layer that includes a second selected subset of the filtered candidate links; and outputting topology data for one of the first solution or the second solution having a lowest total cost, the lowest total cost including a total resource cost to the network for the one of the first solution or the second solution.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1A:
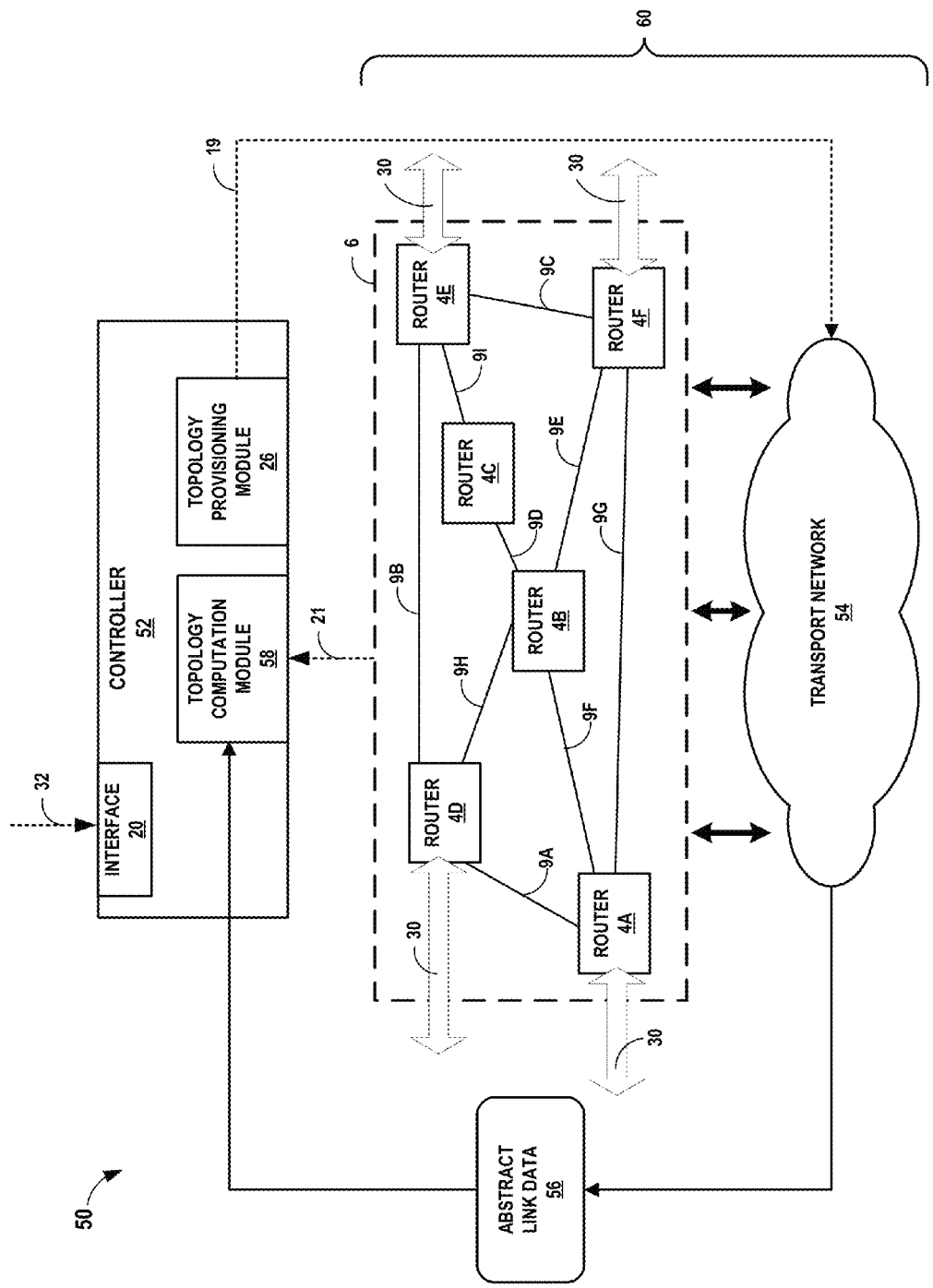
FIGS. 1A-1B are each block diagrams illustrating an example network system in which a management device obtains abstract link data for a multi-layer network and uses the abstract link data to determine logical links for a logical network layer in the multi-layer network, in accordance with techniques described in this disclosure.
Figure 1B:
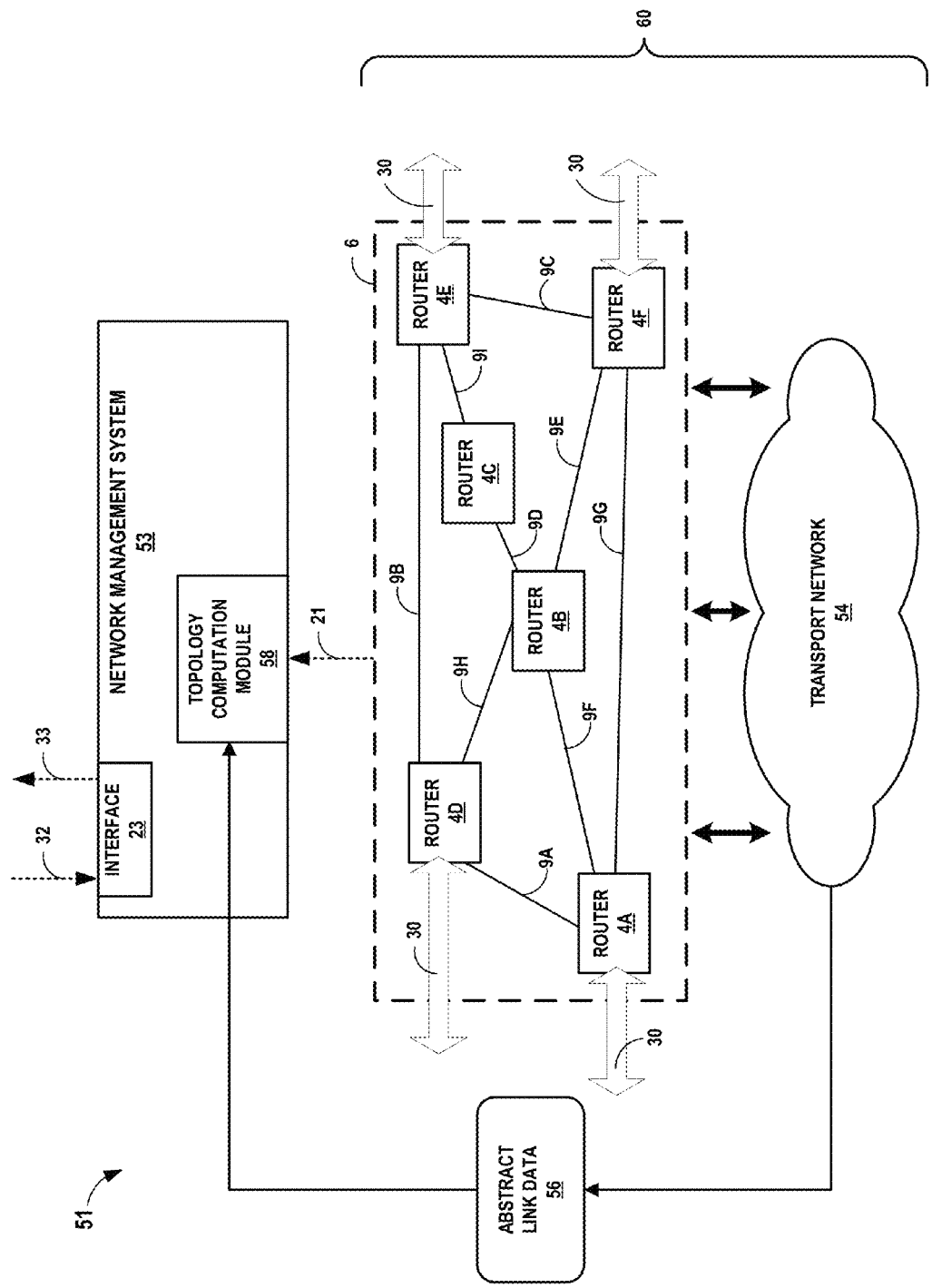

FIGS. 1A-1B are block diagrams each illustrating an example network system in which a management device obtains abstract link data for a multi-layer network and uses the abstract link data to determine logical links for a logical network layer in the multi-layer network, in accordance with techniques described in this disclosure. While topology computation in this disclosure is described primarily with respect to a management device that is a controller capable of provisioning a solution topology into a network, the techniques are similarly applicable to a management device that is a network management system that may not be capable of provisioning the solution topology. Rather, a network operator may use the network management system for network planning and analysis purposes.

In this example, multi-layer network 60 includes logical network 6 and transport network 54. Transport network 54 represents an optical transport network (OTN) or other transport network underlying network 6. Network 6 includes routers 4A-4F (collectively "routers 4") to control switching and routing of packet flows. Network 6 may represent an Internet Protocol (IP) network. Examples of routers 4 include layer 3 (L3) routers and layer 2 (L2) switches or L2/L3 switches that collectively provide network 6. That is, network 6 typically provides L2/ L3 traffic forwarding services, such as traffic engineering via Multiprotocol Label Switching traffic-engineered (MPLS-TE) including label switched paths (LSPs), Virtual Local Area Network (VLANs), and so forth. Various examples of network 6 may encompass many hundreds or even thousands of routers/ switches.

Underlying transport network 54 transports, multiplexes, and switches packet-based communications through high-speed optical fibre links. Transport network 54 may include multiple optical communication devices (e.g., packet-optical transport devices) interconnected via optical links and controlling transmission of optical signals carrying packet data along the optical links. In this way, transport network 54 provides a physical layer that physically interconnects routers 4 of network 6.

Although not shown in FIGS. 1A-1B for simplicity, packet-optical transport devices may be, for example, PCXs, wavelength-division multiplexing (WDM)/dense WDM (DWDM), and time-division multiplexing (TDM)-based devices, optical cross-connects (OXCs), optical add-drop multiplexers (OADMs), reconfigurable OADMs (ROADMs), multiplexing devices, or other types of devices or other devices that transmit, switch and/or multiplex optical signals. As one example, routers 4 may be layer three (L3) routers optically connected by intermediate OXCs of transport network 54, such as OXCs to which the routers 4 have access links.

Transport network 54 typically includes a number of other components, such as amplifiers, transponders, OTTs, repeaters and other equipment for controlling transmission of optical packet data along optical links (also not shown). Large optical transport systems may have significant numbers of such devices that influence optical transmissions. Although described with respect to only optical links, transport system 54 may include other types of physical links as well, such as Ethernet PHY, Synchronous Optical Networking (SONET)/Synchronous Digital Hierarchy (SDH), Lambda, or other Layer 2 data links that include packet transport capability.

Routers 4 are members of a path computation domain served by controller 52 or network management system 53. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks or constrained shortest-path computations for Label-Switched-Paths (LSPs) based on the available RSVP bandwidth on the network links and the IP-traffic routed via these LSPs. In various examples, different combinations of routers 4 may include member routers of multiple ASes. Network links connecting routers 4 may thus be interior links, inter-AS transport links, another type of network link, or some combination thereof.

Logical network 6 is in effect an overlay network "built on top of" underlying transport network 54. Routers 4 are connected by virtual or logical links (an example topology for which is illustrated in FIGS. 1A-1B with links 9A-9I (collectively "links 9")), each of which corresponds to a path in the underlying transport network 54. Each path may include one or more physical links of the transport network 54 (again, such physical links not shown in FIGS. 1A-1B).

In some example implementations, controller 52 provides integrated control over both routers 4 and packet-optical transport devices underlying transport network 54 with respect to transport of packet data through the optical links and other equipment. For example, controller 52 may not only control routing and traffic engineering operations of network 6 but may also provide integrated control over allocation or utilization of the optical spectrum and wavelengths utilized by each packet-optical transport device within transport network 54 that underlies the elements of network 6, or controller 52 may use the path or abstract link information from the transport layer to select candidate links for routing on the transport network 54.

Controller 52 may represent a high-level controller for configuring and managing network 6. Controller 52 may represent one or more general-purpose servers; an appliance, controller, or other special-purpose device for computing paths; an application executed by a computing device; a distributed control plane of routers 4 that computes paths for LSPs managed by the routers; and so forth. In some cases, aspects of controller 52 may be distributed among one or more real or virtual computing devices. Any such devices listed above may be in-network or out-of-network with regard to network 6. Example details of a software-defined networking (SDN) controller for a software-defined network, which may perform operations described herein to compute paths and route LSPs, are described in PCT International Patent Application PCT/US2013/044378, filed Jun. 5, 2013, and entitled, "PHYSICAL PATH DETERMINATION FOR VIRTUAL NETWORK PACKET FLOWS," which is incorporated by reference herein in its entirety. Additional examples details of an SDN controller for a software-defined network to obtain topology information for and to provision a network are described in U.S. patent application Ser. No. 14/042,614, filed Sep. 30, 2013, and entitled "SOFTWARE DEFINED NETWORK CONTROLLER," and U.S. patent application Ser. No. 14/500,736, filed Sep. 29, 2014, and entitled "BATCHED PATH COMPUTATION IN RESOURCE-CONSTRAINED NETWORKS," which are both incorporated by reference herein in their entireties.

Controller 52 may obtain traffic engineering information 21 for network 6 by executing one or more network routing protocols, extended to carry traffic engineering information, to listen for routing protocol advertisements that carry such traffic engineering information. Traffic engineering information may include node and interface identifiers for routers 4; administrative weights and available bandwidth per priority level for links; LSP identifier and state information for virtual links, and other information for computing paths for traffic engineered LSPs. Controller 52 may store traffic engineering information to a traffic engineering database (TED).

Controller 52 in this example presents northbound interface 20 that may be invoked by other controllers in a hierarchical arrangement of controllers or by an orchestrator, administrator, application, or other entity, to present traffic demands 32 for network 6. Interface 20 may be usable for integration with an orchestration system such as OpenStack; interface 20 may also or alternatively usable by other applications or the operator's Operations Support Systems (OSS)/Business Support Systems (BSS). Interface 20 may in some cases present a RESTful Application Programming Interface (API).

In the example of FIG. 1B, network management system 53 represents one or more computing devices that execute software by which a network operator may oversee and manage the operations of multi-layer network 60. Interface 23 may include aspects of interface 20 described with respect to controller 52. Interface 23 may further present GUIs/CLIs by which the network operator may access network management tools including, e.g., topology computation module 58, to obtain information regarding the operations of multi-layer network 60 and to program multi-layer network 60.

A traffic demand corresponds to an end-to-end traffic flow 30 traversing network 6 from one of routers 4 at the network 6 edge to another of routers 4 at the network 6 edge. In the illustrated example, routers 4A, 4D, 4E, and 4F are logically located at the network 6 edge and thus ingress and/or egress traffic flows 30 for transport across network 6.

The traffic demand may be defined according to an expected traffic bandwidth that is to be routed (or re-routed) by the network 6 from a source node to a destination node. In some cases, the traffic demand may be associated with timing/calendaring information that defines an interval during the expected traffic bandwidth will be received by network 6 for transport. A traffic flow corresponds to one or more network packets that each matches a set of one or more properties. Different packet flows may be classified using different properties and property values. For example, some packet flows may be identified as matching a standard 5-tuple (or subset thereof) consisting of transport layer protocol (e.g., User Datagram Protocol (UDP) or Transmission Control Protocol (TCP), source IP address, destination IP address, source port, destination port. Packet flows may also be distinguishable from one another by application protocol (e.g., LDP, ARP, OSPF, BGP, etc.) and/or MPLS labels, for example.

Controller 52 may in some cases determine traffic demands based on current traffic demands being experienced by network 6, in which case controller 52 may apply the techniques described herein in near-real-time to modify a network 6 topology to potentially improve the traffic routing. In some cases, controller 52 may receive via interface 20 or estimate projected demands based on patterns of demands previously experienced by network 6, upcoming application activation, or other known and/or expected changes to the traffic demand patterns, such as changing the peering point for the entry to the network of data from a major customer, adding a new node or point of presence, merging two or more networks, and so forth. For example, controller 52 or another controller may analyze traffic LSP statistics and trends to project future traffic demands on network 6. These may be useful for long-term planning for network 6.

The various traffic demands form a traffic demand matrix of traffic demands from the various possible source/ingress routers 4 to the various possible destination/egress routers 4. In accordance with techniques described herein, controller 52 includes topology computation module 58 that determines a topology of network links 9 for network 6 by which routers 4 may switch network traffic flows 30 in order to meet the traffic demands corresponding to the traffic flows 30.

Topology computation module 58 may determine the logical network topology for network 6 to ensure sufficient capacity in the event of a failure of components of transport network 54 and to facilitate an optimized total resource cost to the network 6 for transporting the traffic. Topology computation module 58 obtains a set of candidate links available for use as network links in network 6. Topology computation module 58 additionally, in some instances, obtains abstract link data 56 describing the shared-risks encountered by these candidate links on their physical (transport) paths. In some cases, abstract link data 56 also defines the available candidate links and may define additional abstract links already configured and activated in network 6. Abstract link data 56 is, in other words and in such cases, the mechanism by which topology computation module 58 obtains the set of candidate links. Abstract link data 56 may further include information relevant to path optimization such as the physical length or delay of the link in some cases.

Abstract link data 56 in this way represents data "leaked" in some manner from the transport network 54 to controller 52 to enable the application of further constraints by topology computation module 58 to the determination of paths and corresponding candidate links on which to route traffic. Such constraints may correspond to the types of abstract link data 56, which may include available candidate links, link lengths, link metrics (which may be based on link lengths), link costs (which may also be based on link lengths), and a list of Shared Risk Link Groups (SRLGs) for links.

Topology computation module 58 may obtain abstract link data 56 in some cases by building additional candidate links for the controller 52 to use (if required and if the use of such links would result in a lower-cost overall solution) based on user-defined or application-defined rules set in data files and configured in controller 52 for controlling transport network 54. In other words, controller 52 may build candidate links from candidate link definitions obtained by controller 52. For example, a user or application may define groups of packet-optical transport devices as types of nodes within transport network 54, e.g., access nodes, core nodes, and supercore nodes and may indicate the circumstances in which the packet-optical transport devices allow connections within a group or between groups. For instance, the rules may specify:

Access nodes can connect to the three nearest core nodes.
Core nodes can connect to the two nearest other core nodes.
Core nodes can connect to the two nearest supercore nodes.
Any supercore node can connect to any other.

The above rules are merely examples. The defined rules may also define the administrative weighting scheme usable by the software to transport the traffic if a candidate link is used to transport traffic. With regard to the above, the defined rules determine only candidate links and do not specify that such links must be used to transporting traffic. After applying techniques described herein to determine paths for links for a network 6 topology, controller 52 may configure only the selected subset of the available links indicated in the candidate links for use in transporting traffic. In addition, controller 52 may be unable to add links to a given solution if such links are not in the collection generated in the candidate link sets. By contrast, topology computation module 58 may use links already defined for network 6 even if such links are not in the candidate link set. In other words, topology computation module 58 may be unable to use links in determining a solution unless the links are defined either in the candidate link set or already exist in the network 6.

Controller 52 may route the available candidate links in transport network 54 to determine their actual physical lengths and the shared-risks (SRLGs), for instance, in the link paths in the transport network 54. Paths for such links may be pre-computed prior to choosing the candidate links, as described in further detail below. Because the shortest path for a transport route may be excessively restrictive for purposes of failure resiliency, e.g., to protect against a failure of an SRLG from a transport link, topology computation module 58 may determine multiple paths for a given candidate link from which topology computation module 58 may choose. In some examples, the multiple paths for a given link may include the shortest path, the shorter of two diverse paths, and the longer of two diverse paths. While the shortest path and the shorter of two diverse paths may be identical, this need not necessarily be the case. Controller 52 may determine the diverse paths using a strong diverse path algorithm suitable for finding shortest diverse-cycle paths and taking account of SRLGs if available. In some cases, a logical link such as any of links 9 may already be configured in network 6 (i.e., "exist"), and the path for the logical link in transport layer 54 may be obtained by controller 52. In such cases, the known path can be fixed and the diverse paths describe above may not be determined or utilized by topology computation module 58. Additional details regarding example techniques for computing diverse paths are described in David Wood & Ping Wang, U.S. patent application Ser. No. 14/585,170, filed Dec. 29, 2014, and entitled "POINT-TO-MULTIPOINT PATH COMPUTATION FOR WIDE AREA NETWORK OPTIMIZATION," which is incorporated by reference herein in its entirety.

Because in some cases paths for links chosen from the candidate set or pre-computed prior to iteratively determining solutions for traffic demand matrix, topology computation module 58 may in some embodiments avoid attempting to design the paths for the links in such a manner as to account for available wavelengths in the transport network 54 elements. This, in effect, allows topology computation module 58 to assume the optical (e.g., WDM) capacity does not limit the determination of solutions for the demands.

Upon selecting a candidate link, controller 52 may map the routed path for the candidate link to SRLG information for transport link sections or nodes having the SRLG information and underlying the path (i.e., transporting traffic in the transport network 54 to effectuate the path). Controller 52 may in some cases prune the set of candidate links based on the number of routers 4 the links "bypass" in the transport network, which may allow the candidate link set to be reduced on the basis of the transport link topology and the equipment rather than merely on the basis of length. This may further enable realistic modelling of core IP networks made up of high-speed routers having only direct lambda optical connections or a restricted set of connections that are limited to bypass only a small number of nodes. Thus, all IP-Layer links whose routes bypass these high-speed routers may be pruned from the candidate set of links.

As noted above, topology computation module 58 may obtain abstract link data 56 from an abstract link file or other data structure obtained from, e.g., a third-party network management system for transport network 54 or built by a user. Topology computation module 58 may in this way obtain an abstract picture of the transport layer represented here by transport network 54 but remain unaware of the details of the transport network 54 topology. In other words, topology computation module 58 may have a restricted or merely abstract picture of the transport network, taken via abstract link data 56 from a transport network 54 controller or derived from an export of a transport network 54 network management system (NMS), for instance. Obtaining abstract link data 56 in this way may be advantageous, for the rules defining whether candidate links or are not available depend upon the particularities of the various packet-optical transport devices employed in transport network 54. Obtaining candidate links directly as a set of "abstract links" from an abstract link file may enable more-complex constraints on the connections than are possible using relatively simple formulae for candidate link generation as described above.

As noted above, abstract link data 56 may include link information for available candidate links such as link lengths, link metrics, link costs, and/or a list of Shared Risk Link Groups (SRLGs) for links. In order to perform designs that take into account potential failure modes in the transport network of fibre-cuts, or WDM/optical component failures, as well as failures of devices and interfaces in the IP layer, the topology computation module 58 may account for the transport layer equipment used by the IP links by applying penalties to links according SRLGs. Controller 52 may, for instance, obtain the SRLG information for transport layer elements corresponding to candidate links identified in abstract link data 56. Such SRLG information could be for fibre sections, conduit (ducts) carrying the fibres, transport layer switching elements, and so forth. Controller 52 may obtain such SRLG information for any existing links in network 6. Controller 52 may obtain such SRLG information for existing links to understand the failure modes of the network 6 modified to include candidate links described in abstract link data 56 and selected by topology computation module 58 during an iteration for determining solutions for the traffic demand matrix according to techniques described herein.

With regard to the above, resiliency mechanisms need to rely on predicting which resources have a high likelihood to fail contemporaneously in order to correctly assign redundant routes. In a simple network, a node or a link between nodes may fail due to a local failure. However in a packet/optical network, a single fibre cut of a DWDM link would affect all wavelengths transported. Moreover, each individual wavelength may connect different pairs of routers such that a single fibre cut in the optical network appears to be a triple or quadruple failure in the network topology, as may occur when there are more than two layers, e.g., IP over SDH over WDM (SDH over WDM representing transport network 54 in this example).

To cope with such situations, an SRLG or a set of SRLGs is assigned as a link attribute. An SRLG may be, for instance, represented by a 32-bit number unique within an IGP (OSPFv2 and IS-IS) domain, such as network 6 or an IGP within network 6 where network 6 encompasses multiple domains. A link may be assigned multiple SRLGs. The SRLG of a path in a label-switched path (LSP) is the set of SRLGs for all the links in the path. Topology computation module 58 may use SRLG information provided in abstract link data 56 when determining paths for candidate links. In general, when computing diverse paths for a candidate link, it is preferable to find paths such that the primary and secondary paths do not have any links in common in case the SRLGs for the primary and secondary paths are disjoint. This ensures that a single point of failure on a particular link does not bring down both the primary and secondary paths. By comparing the SRLG attributes of links, a topology computation module 58 can apply penalties during an iteration to facilitate disjoint SRLG attributes between the sets of links for the primary path and the secondary path and in this way arrive at diverse failure routes.

As a prerequisite, SRLGs of the optical domain represented by transport network 54 must be leaked into the packet domain represented by network 6. SRLGs may thus enable synchronizing routing decisions between layers of multi-layer network 60. Moreover, the nature of SRLG information is layer independent and can therefore be used as common reference information for routing at any layer.

In addition to or alternatively to representing shared risks for the abstract links, abstract link data 56 may indicate resource constraints for a given set of the abstract links (or an SRLG that contains a set of the abstract links) A resource constraint for the set of abstract links may specify that only a specified number of abstract links from the set may be selected for use in a network topology for network 6. For example, a particular fibre section in transport network 54 may have a limit of 40 wavelengths for carrying network links activated on the fibre section. By specifying a resource constraint of 40, e.g., on a particular set of candidate links that traverse the fibre section, the abstract link data 56 may ensure that only a maximum of 40 of the particular set of candidate links may be selected by topology computation module 58 for activation in the network 6.

Topology computation module 58 iteratively analyzes candidate links and abstract link data in view of the traffic demand matrix to select a subset of the candidate links to efficiently and robustly carry the demands. In response to topology computation module 58 determining a logical network topology made up of the selected subset of candidate links, the topology provisioning module 26 may signal, to transport network 54 (or to the network operator), determined network topology information 19 required to route the selected subset of candidate links as demands in the transport layer represented by transport network 54. Network topology information 19 may include the selected subset of the candidate links. The selected subset of the candidate links may be expressed in network topology information 19 as a set of demands for the transport network 54.

In the example of FIG. 1B, network management system 53 may present, via interface 23, a representation 33 of the selected subset of candidate links to the network operator. The representation 33 may include an output to a GUI display, a text or data file, and/or a bill of materials, e.g., that describe the selected subset of candidate links to the network operator.

By applying techniques described in this disclosure, a management device such as controller 52 or network management system 53 may facilitate global optimization, with respect to a total cost to the network, of the network 6 topology for the satisfaction of a traffic demand matrix. In some examples, the management device may further facilitate a configuration of the network 6 able to carry the traffic demand matrix under any single element failure, while also satisfying other constraints applied to the network 6, such as delays, the number of next hops, the total resources defined as available in specific places on the network, etc., for a given path through the network; or applying penalties to the overall cost if the intermediate solution does not meet these requested constraints. While the globally-optimal solution may not be reached in all cases, the techniques may avoid at least some local minima on the total cost of solutions gradient, which may result in robust yet lower resource cost solutions.

Figure 2:
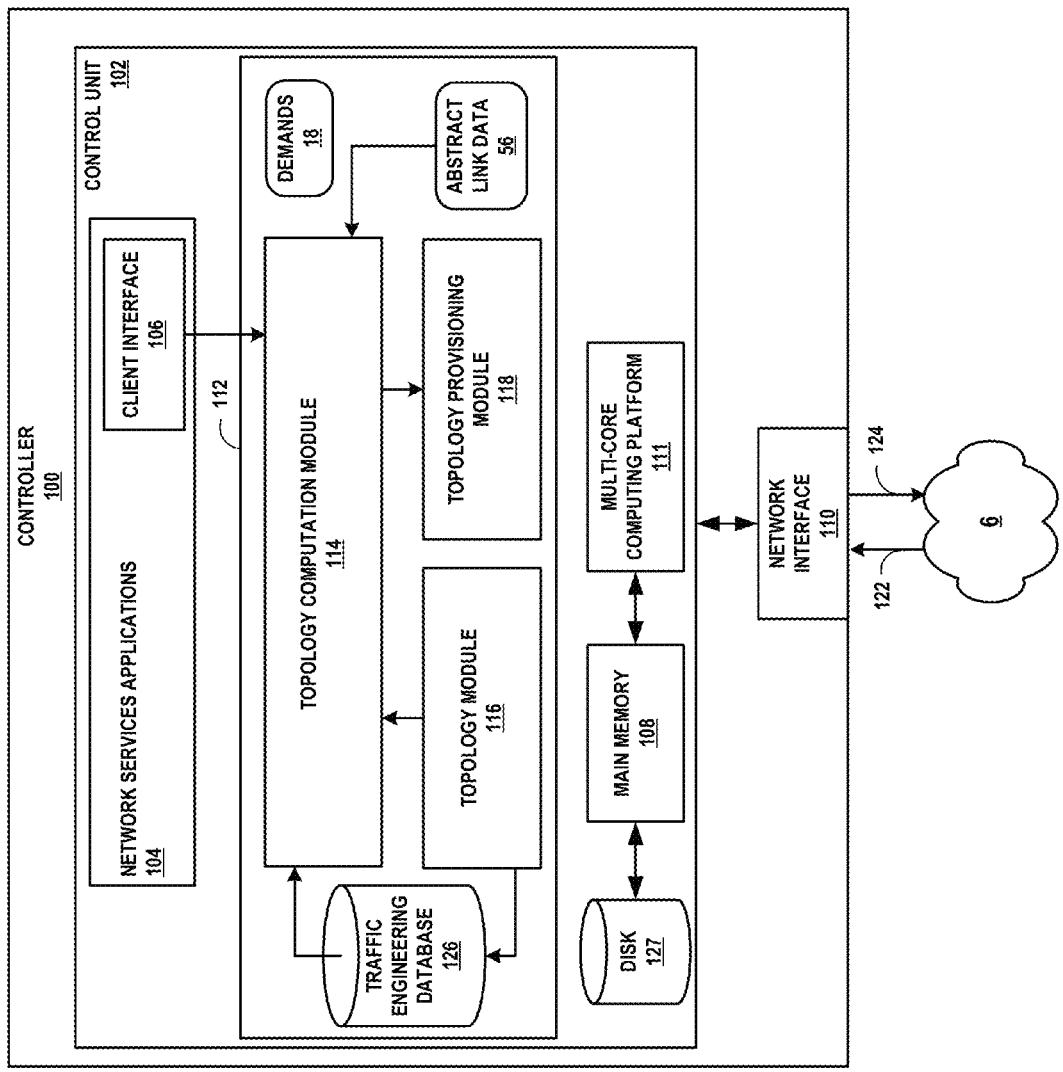
FIG. 2 is a block diagram illustrating an example management device configured to determine a logical network topology for routing traffic flows, in accordance with techniques of this disclosure.

FIG. 2 is a block diagram illustrating an example management device configured to determine a logical network topology for routing traffic flows, in accordance with techniques of this disclosure. In response to receiving demands, controller 100 computes and outputs a logical network topology that meets the traffic demand matrix for the network 6. Controller 100 may include a server or network controller, for example, and may represent an example instance of controller 52 of FIG. 1A. In some instances, controller 100 may represent an example of network management system 53 of FIG. 1B. In such instances, controller 100 may not include topology provisioning module 118 and may include an interface similar to interface 23 for outputting a representation of selected filtered links for a solution.

Controller 100 includes a control unit 102 coupled to a network interface 110 to exchange packets with other network devices by one or more inbound links 122 and one or more outbound links 124. Main memory 108 of control unit 102 represents one or more computer-readable storage media, which may include random-access memory (RAM) such as various forms of dynamic RAM (DRAM), e.g., DDR2 SDRAM, or static RAM (SRAM), Flash memory, or any other form of fixed or removable storage medium that can be used to carry or store desired program code and program data in the form of instructions or data structures and that can be accessed by a computer. Main memory 108 provides a physical address space composed of addressable memory locations accessible by modules 112, 104.

Main memory 108 is coupled to disk 127, which may comprise computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store data and instructions.

Control unit 102 in this example includes multi-core computing platform 111 to execute modules 104, 112. Multi-core computing platform includes multiple processing cores that each includes an independent execution unit to perform instructions that conform to an instruction set architecture for the core. Cores of multi-core computing platform 111 may each be implemented as separate integrated circuits (ICs) or may be combined within one or more multi-core processors (or "many-core" processors) that are each implemented using a single IC (i.e., a chip multiprocessor).

Multi-core computing platform 111 executes software instructions, such as those used to define a software or computer program, stored to main memory 108. Alternatively or additionally, control unit 102 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 102 provides an operating environment for network services applications 104 and topology element 112. In some examples, these modules may be implemented as one or more processes executing on one or more virtual machines of one or more servers. That is, while generally illustrated and described as executing on a single controller 100, aspects of modules 104, 112 may be executed on other computing devices or on different virtual machines of one or more computing devices.

Network services applications 104 represent one or more processes that provide services to clients of a service provider network that includes network 6 and controller 100 to manage connectivity in the path computation domain. Network services applications 104 may provide, for instance, include movie, television, or other media content distribution, Voice-over-IP (VoIP), Video-on-Demand (VOD), bulk transport, walled/open garden, IP Mobility Subsystem (IMS) and other mobility services, and Internet services to clients of a service provider network controlled at least in part by controller 100. Networks services applications 104 may issue demands to topology element 112 to request transport services of network 6. One or more of network services applications 104 may include or otherwise make use of a client interface 106 by which one or more client applications request transport services. Client interface 106 may represent a command line interface (CLI) or graphical user interface (GUI), for instance. Client 106 may also, or alternatively, provide an application programming interface (API) such as a web service to client applications.

Network services applications 104 may issue demands to topology element 112 to request respective paths in a path computation domain controlled by controller 100 from sources to destinations. For example, a demand may include a required bandwidth or other constraint and two endpoints representing a source and a destination that communicate over the path computation domain managed by controller 100. Control unit 102 stores demands as a list of demands in the demands 18 data structure ("demands 18"). In some cases, the service provider or other administrator of network 6 may configure, via an administrative interface, one or more demands 18. In some cases, topology element 112 may additionally or alternatively derive projected demands 18 based on patterns of demands previously experienced by network 6.

Topology element 112 accepts demands to route traffic between the endpoints for the demands over the path computation domain. Demands may be requested for different times and dates and with disparate bandwidth requirements. Topology element 112 may reconcile demands from network services applications 104 to multiplex requested paths for the corresponding traffic onto the network 6 path computation domain based on demand parameters and network resource availability.

To intelligently compute a topology for network layer 6, topology element 112 may in some cases include topology module 116 to receive traffic engineering information, such as traffic engineering information 21, describing available resources of network 6, including routers 4 and interfaces thereof and interconnecting network links. Topology module 116 may execute one or more southbound protocols, such as Open Shortest Path First with Traffic Engineering extensions (OSPF-TE), Intermediate System to Intermediate System with Traffic Engineering extensions (ISIS-TE), BGP Link State (BGP-LS), to learn traffic engineering information for network 6.

Traffic engineering database (TED) 126 stores traffic engineering information, received by topology module 116, for network 6 that constitutes a path computation domain for controller 100. TED 126 may include one or more link-state databases (LSDBs), where link and node data is received in routing protocol advertisements, received from a topology server, and/or discovered by link-layer entities such as an overlay controller and then provided to topology module 116. In some instances, the service provider or other administrative entity may configure traffic engineering or other topology information within TED 126 via an administrative interface.

In accordance with techniques described in this disclosure and to satisfy demands 18 for network 6, topology computation module 114 of topology element 112 determines and optimizes paths for demands 18. Topology computation module 114 applies techniques described in this disclosure to iteratively determine solutions for demands 18 to facilitate a globally-optimized total resource cost to the network 6 and underlying transport network for transporting the traffic. Topology computation module 114 may represent an example instance of topology computation module 58.

To that end, topology computation module 114 obtains abstract link data 56 describing candidate links for network 6 and the shared-risks encountered by these candidate links on their physical (transport) paths, as well as information relevant to path optimization such as the physical length or delay of the link in some cases. Topology computation module 114 iteratively analyzes candidate links and other abstract link data in view of demands 18 to select a subset of the candidate links to efficiently and robustly carry traffic corresponding to demands 18.

Topology computation module 114 having selected and routed a subset of the candidate links for network 6, topology provisioning module 118 attempts to set the routed paths for the candidate links onto network 6. Topology provisioning module 118 of controller 100 may program the paths into network 6 to cause the state of network 6 to match the state of network 6 as determined by topology computation module 114. Topology provisioning module 118 may represent an example of topology provisioning module 26. Provisioning a path may require path validation prior to committing the path to provide for packet transport. Topology provisioning module 118 executes one or more southbound protocols for path provisioning to inject state into elements of network 6, such as any one or more of routers 4. A southbound protocol refers to a protocol by which components of controller 100 may communicate with network 6 elements, such as routers 4, to obtain or inject topology information, forwarding, and other network information that determines the operation of the network 6. For example, southbound protocols may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network elements, Simple Network Management Protocol (SNMP), and OpenFlow (or other SDN configuration protocol).

Topology module 116 may receive updated traffic engineering information from network 6, which may trigger dynamic re-computation by topology computation module 114 of a topology for network 6. For example, TED 126 upon receiving a new or updated TE link or receiving information that a TE link has failed may trigger topology computation module 114 to re-compute the paths, which may include respective diverse paths, for candidate links in order to account for the TED 126 change.

Topology computation module 114 may additionally/alternatively dynamically re-compute an updated network 6 topology on receipt on new or updated abstract link data 56. For example, updated abstract link data 56 may indicate a new SRLG for a link, which may indicate previously-diverse paths candidate now have a common SRLG and are thus no longer diverse with respect to SRLG. Topology computation module 114 may, as a result, re-compute diverse paths for the candidate link in order to again obtain diversity for the candidate link.

Figure 3:
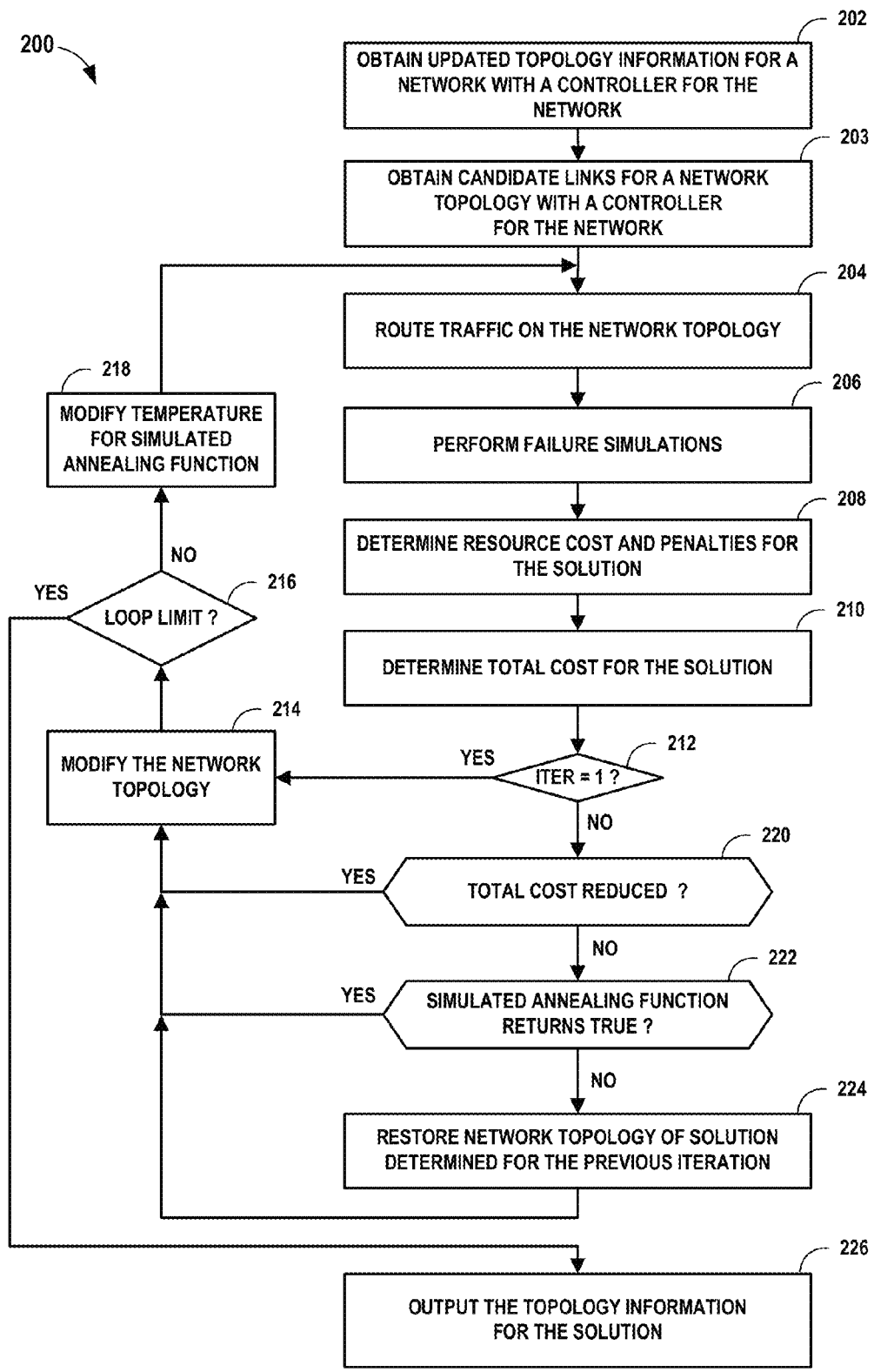
FIG. 3 is a flowchart illustrating an example mode of operation for one or more management devices to determine and optimize a logical network topology according to techniques described in this disclosure.

FIG. 3 is a flowchart illustrating an example mode of operation for one or more management devices to determine and optimize a logical network topology according to techniques described in this disclosure. Operation 200 is described with respect to controller 52 but may be applied by a decentralized control plane made up of multiple controllers or router control planes, or by one or more network management devices, for instance.

Topology computation module 58 obtains live topology information 21 for network 6 including routers 4 that in this example cooperatively implement an IP routing plane (202). Topology computation module 58 also obtains candidate links for network 6, the candidate links available for use in optimizing the logical network topology (203). The determined solution typically does not use all candidate links obtained, and controller 52 applies operation 200 to determine the subset of candidate links to use to build the lowest cost network topology. Topology computation module 58 may obtain candidate links by building the candidate links based on user-defined rules configured in or otherwise received by controller 52. Topology computation module 58 may route these newly-built links in transport network 54 to determine their actual physical lengths and the shared-risks (SRLGs) that the newly-built links encounter in their paths in the transport layer. In some cases, these paths are pre-computed when the calculation starts. To compute the paths, topology computation module 58 may calculate three paths and the optimisation algorithm is free to choose between these:

1. Shortest path
2. The shorter of the two paths on a calculated "shortest-diverse-cycle"
3. The longer of the two paths on a calculated "shortest-diverse-cycle"

Often the first two paths of these paths are identical but this is not necessarily the case. Topology computation module 58 may apply a "strong" diverse path algorithm that works well to find shortest diverse-cycle paths in complicated networks taking account of SRLG information if available. More generally, topology computation module 58 may determine N "non-identical", non-looping transport layer paths within some bound of total path-metric from the shortest/shortest-cycles paths. These N will be filtered later by the optical systems calculations according to techniques described herein. For example, topology computation module 58 may determine seven "reasonable" transport layer paths—the shortest path; two paths from the shortest cycle and four others different to these paths and to each other. As described herein, topology computation module 58 may then filter these paths based on the optical constraints, resulting in K<N useable paths. These K paths are then treated as feasible candidate links for the main optimisation algorithm. If a logical-link already exists and its path in the transport network 54 is known, then this can be read into topology computation module 58 and the known route can be fixed—and the diverse-path set described above is not determined.

In some cases, because these paths are all pre-calculated before the applying operation 200, topology computation module 58 may not attempt to design the paths taking into account available wavelengths in the transport network 54. Topology computation module 58 instead assumes in such cases that the WDM capacity does not limit the design. Alternatively, the computation module may have information on the WDM resource constraints (e.g., obtained from abstract link data 56) and apply penalties to a solution if the solution does not meet these constraints. Once the path is selected, topology computation module 58 maps these paths to SRLG information for the IP links carried over each transport network 54 link section or node. Related to the transport paths, topology computation module 58 may in some instances have a user-configurable parameter for pruning the set of candidate links based on the number of IP nodes the links "bypass" in the transport layer. This allows the candidate link set to be reduced on the basis of the transport link topology and the equipment passed rather than on the basis of distance, for example.

Topology computation module 58 may alternatively receive abstract link data 56 that includes information describing candidate links. In some cases, abstract link data 56 is a file built as a data extraction from a third-party network management system for the transport layer. In some cases, a network operator for network 6 may build such a file by applying a script to or otherwise manipulating available transport layer data. Obtaining candidate link information directly in this way from abstract link data 56, e.g., provides only an abstract or restricted description of transport network 54 that does not include details of the transport layer topology. As a result, topology computation module 58 may apply more complicated constraints for determining selected candidate links. For example, a network operator may specify maximum counts, maximum delay, maximum capacity on any group of links, or SRLGs (or any combination thereof). Topology computation module 58 may apply such constraints to topology determination for network 6, where such constraints are "soft-constraints" in that solutions that violate the requirements of the constraints are not forbidden but rather receive a penalty cost that is added to the total network cost (topology computation module 58 iteratively applies steps of operation 200 to determine solutions that reduce or bring to zero these penalties).

Information describing the candidate links may include available links and associated link metrics, link costs, and/or SRLGs on the link. The combination of live topology information 21 for network 6 and the obtained candidate links define a network topology model for network 6. Topology computation module 58 routes the traffic demands for network 6 on the network topology model (204). Example detailed operations for routing traffic demands are included below with respect to FIGS. 4-5.

Topology computation module 58 then performs failure simulations with respect to the solution represented by the current network topology model including the current subset of candidate links over which topology computation module 58 has routed any of the traffic demands (206). The failure simulations determine penalties to be applied to the solution if, for instance, traffic cannot be protected, certain failure-resistance constraints are not met, or fixed equipment is required to exceed its constrained capacity in order to carry the traffic. Example details of a failure simulation are provided below with respect to FIG. 6.

Topology computation module 58 determines a resource cost to the network 6 for the solution and the penalties for the solution (in addition to those determined during the failure simulation) (208). To determine the resource costs for the purpose of optimization, topology computation module 58 determines a total resource cost of all the equipment in multi-layer network 60. Such costs may be based at least in part on link capacities (or "dimensions") needed to carry the traffic. The total resource cost formulas are operator-configurable, such that an operator may focus attention on a single measure of the network "costs" (such as total link "mileage" or "total interface count") or may use the formulas to gain a realistic measure of actual costs in order to form a fair comparison between different potential solutions. In some cases, the operation may add at least some component to the costs to reflect, e.g., that all else being equal "shorter-links" are better to use than "longer-links," etc. For instance, this may be reflected in the cost formula by adding a small component to the link costs that is proportional to distance. Such small changes to the cost formulas often make it very much easier for topology computation module 58 to identify an advantageous solution for large problems as topology computation module 58 can find some indication of the direction to steer the solution along the cost gradient. Topology computation module 58 in some cases may also attempt to do simple allocation of the node-equipment based on the number of links on the node and the traffic through it. As can be deduced from the above description, the optimum solution for a network where the costs are dominated by the interface (link) count will look very different to the optimum solution for a network where the costs are dominated by the link-mileage.

Topology computation module 58 additionally determines penalties for the solution. For example, the solution may violate one or more constraints having associated penalties. Such constraints may include, as noted above, maximum counts or maximum capacity on any group of links or SRLGs (or combination of the two). Topology computation module 58 may therefore determine which constraints are violated by the solution and apply the associated penalty. The failure simulations of step 206 may also accrue penalties for, e.g., traffic that cannot be routed in the solution under either normal or failure conditions. Topology computation module 58 accumulates the penalties applied to a solution and adds the accumulated total penalty cost to the total resource cost to determine a total cost for the solution (210).

For the initial run (iteration) of the optimization algorithm (YES branch of 212), topology computation module 58 does not perform a comparison with a previous solution but instead modifies the network topology (214). To modify the network topology of network 6, topology computation module 58 may either (1) select one of the candidate links to block by adding a high (but not infinite) penalty to the routing metric on the candidate link, (2) select a candidate link that had been previously blocked to 'unblock' by removing a penalty previously applied on the routing metric for the selected candidate link, or (3) (in some cases) routing the link on a different path in the transport layer such that the new path changes the shared-risk-groups encountered by the link in the logical network layer and the capacity requirements in the transport network 54. Topology computation module 58 may choose between blocking or unblocking and select a link according to a random function. Topology computation module 58 in some cases, however, may apply simple heuristics such as biasing more expensive links toward blocking and less expensive links toward unblocking, by biasing more toward blocking links that have very low traffic on them [e.g., a very low ratio (traffic carried)/(link cost)] and towards unblocking shorter links on busy node, or by biasing the selection such that active links that are on shared resource constraints at or above their constrained capacity may be preferentially selected for blocking.

Having modified the network topology for purposes of the algorithm, topology computation module 58 applies steps 204, 206, 208, and 210 to determine a new solution having newly routed traffic and to determine a total cost for the new solution. This is a subsequent iteration (NO branch of 212). Topology computation module 58 compares the total cost for the new solution with the total cost for the previous solution (220), and if the total cost has been reduced with the new solution (YES branch of 220), topology computation module 58 accepts the modified network topology and proceeds to step 214. If however the total cost has not been reduced with the new solution (NO branch of 220), topology computation module 58 applies a simulated annealing function to determine whether to accept the modified network topology despite the modified network topology leading to a larger total cost (222). In this way, topology computation module 58 may facilitate avoiding local minima of the total cost gradient to progress the solutions to a more globally-optimal solution. The simulated annealing function is a function that returns a positive result according to probability dependent on the magnitude of the cost increase and the iteration progress of the operation 200 (e.g., the number of iterations). As one example, the probability for the function may be defined as:

$$\exp\left(-\frac{\Delta C}{T}\right),$$

where $\Delta C$ is the magnitude of the cost increase vis-à-vis the previous solution and T is a "temperature" parameter that topology computation module 58 generally but not exclusively reduces as the number of iterations increases. If the simulated annealing function returns a positive result (YES branch of 222), topology computation module 58 proceeds to step 214. If the simulated annealing function returns true (NO branch of 222), which is typically more likely, topology computation module 58 rejects the modified network topology and restores the network topology determined for the previous iteration (224). In this way, topology computation module 58 may effectively jump out of a local minima.

Figure 7:
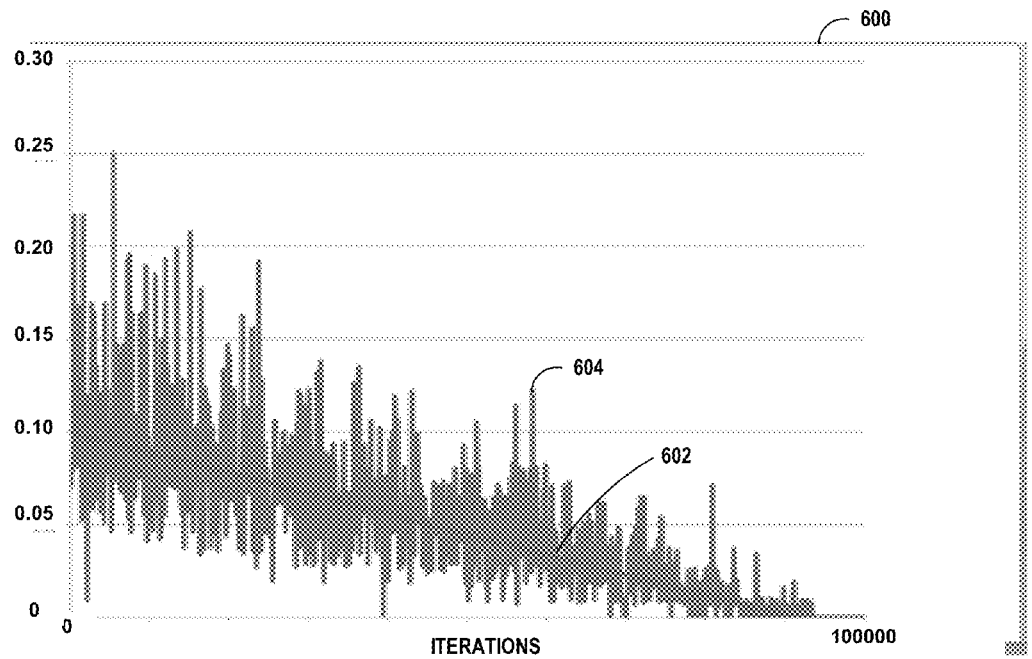
FIGS. 7-9 depict charts illustrating intermediate and final parameters and results during an example run to determine a network topology for a network according to techniques described in this disclosure.
Figure 8:
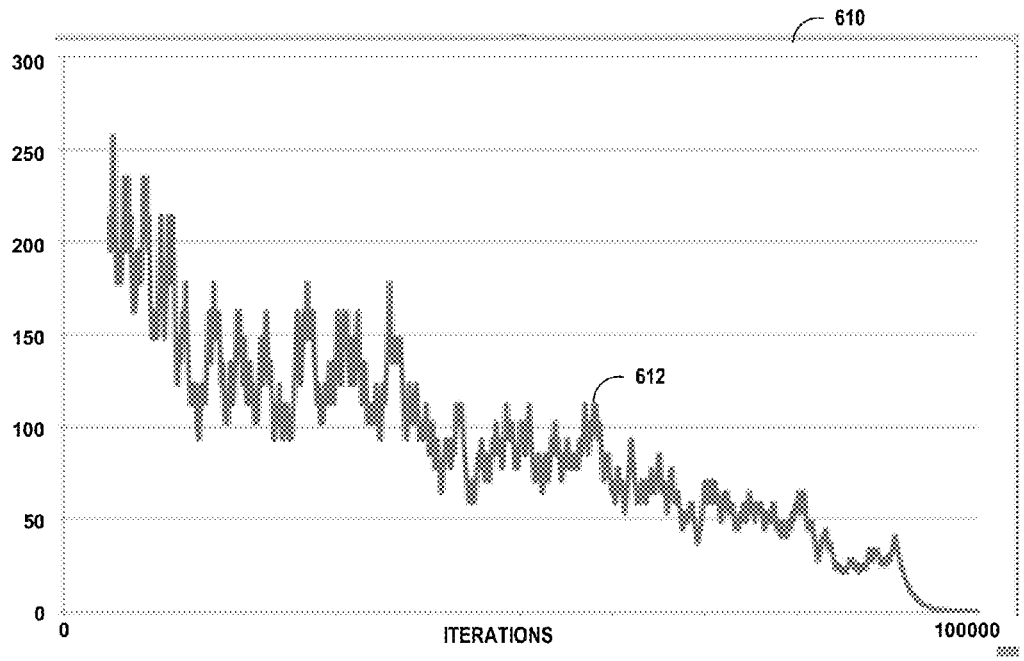
Figure 9:
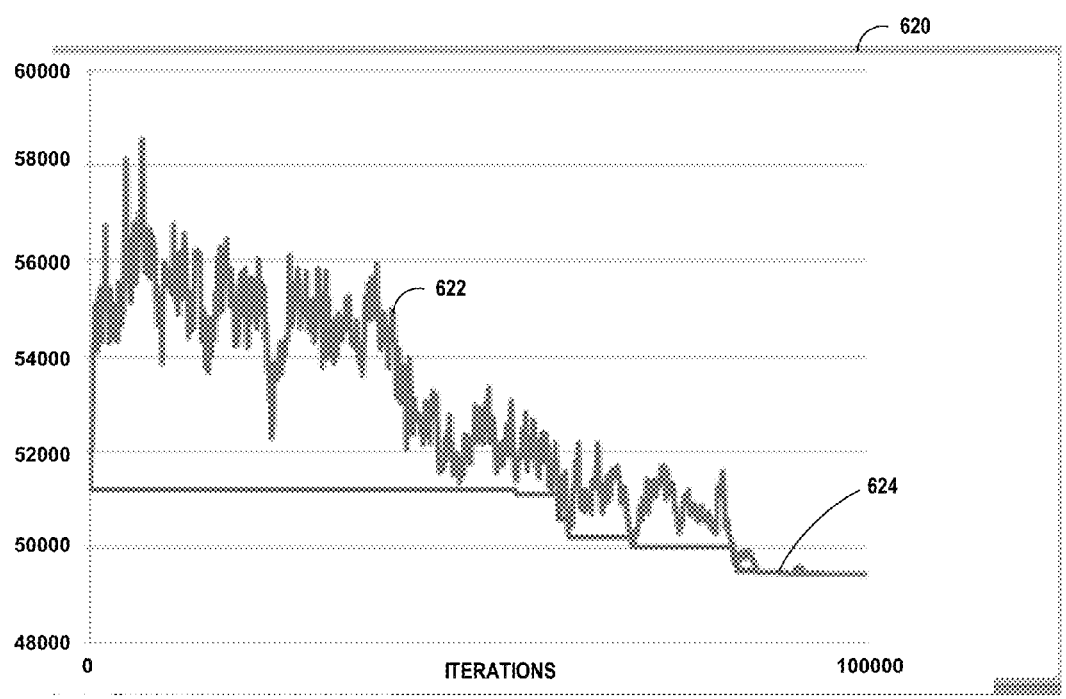

At step 214, topology computation module 58 modifies the network topology by blocking or unblocking one or more candidate links as described above (214). If the number of iterations to be performed has not been reached (NO branch of 216), topology computation module 58 modifies the temperature parameter for the simulated annealing function applied in step 222 (218). This reduction may be proportional to the number of iterations, based on configurable thresholds for the number of iterations, or some other scheme. Parameter T may be user-configurable or dependent on some aspect of the computation, such as the number of candidate links, or other aspect. To facilitate a global optimum algorithm, topology computation module 58 should spend as much time as possible in the temperature region where a reasonable percentage of the changes will increase the cost and then gradually reduce this percentage. As one example for determining T, at the start of the operation 200 topology computation module 58 sets a target percentage to 10% such that 10% of network topology modifications result in a cost increase. At the end the target percentage is set to 0%. During the iteration the target percentage is reduced linearly as the iteration progresses. For instance, every N iterations, topology computation module 58 will check the actual percentage of changes that increase the cost and check this against the target value. If the actual percentage is too high, then topology computation module 58 will decrease the parameter T. If this actual percentage is too low then topology computation module 58 will increase the parameter T. Example intermediate and final results of this process are depicted in FIGS. 7-9, below.

Once the iteration loop limit has been reached and the number of iterations to be performed are performed (YES of 216), topology computation module 58 exits the operation. In some cases, the iteration complete check of step 216 is based on other acceptance criteria, such as iterating: for a fixed elapsed time, until the total resource costs are less than some acceptable value, or until some other acceptance criteria is met. During the run of operation 200, topology computation module 58 stores the solution for the lowest-cost solution identified during any of the iterations. While the lowest-cost solution identified during operation 200 may not be globally optimal, the solution may nevertheless be optimized versus the initial determination or at least in some instances versus a solution that can be obtained in practice by alternative methods. Topology provisioning module 26 outputs the topology data determined for the solution, which may include the selected candidate links, to the transport layer to set up the selected candidate links to establish the determined network 6 topology (226). In some cases, topology provisioning module 26 configures the selected candidate links. In some cases, topology computation module 58 outputs the topology data determined for the solution to a network operator via an interface, by outputting a file, or otherwise presenting the topology data for use by the network operator.

Figure 4:
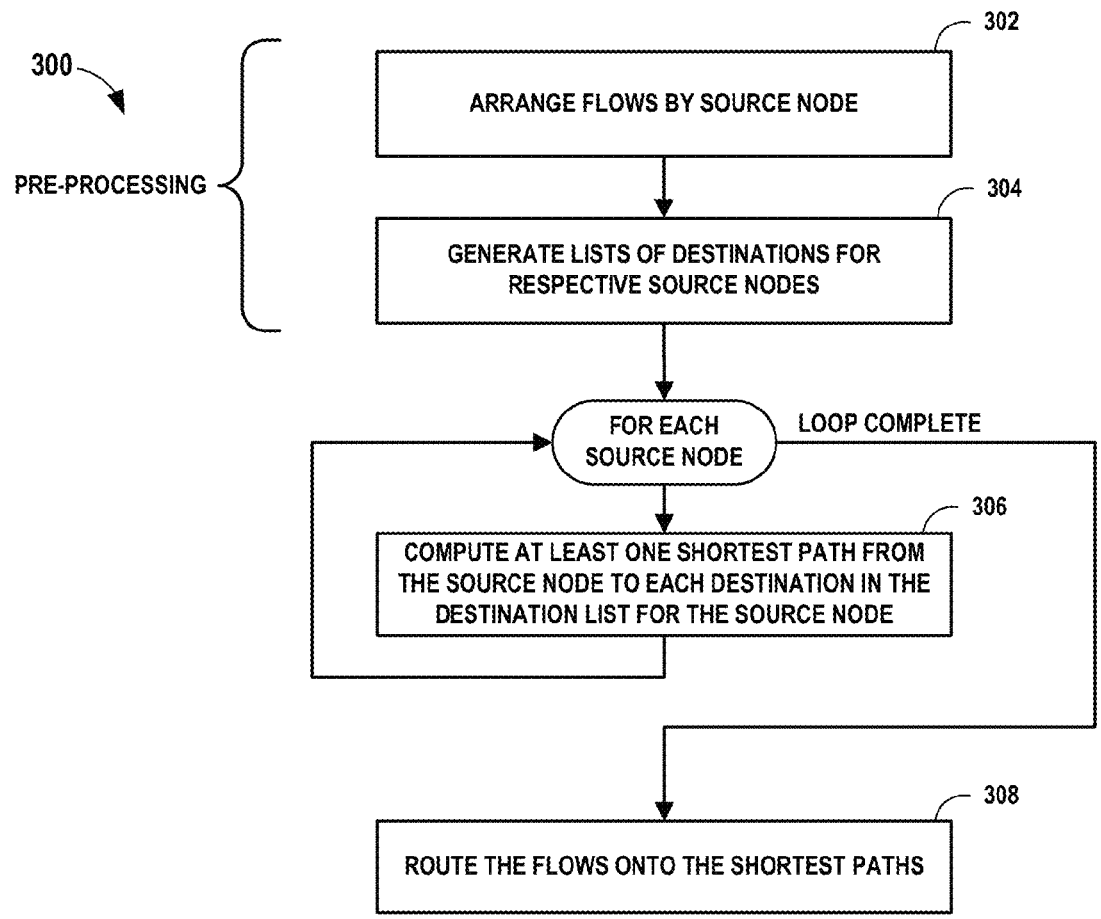
FIG. 4 is a flowchart illustrating an example mode of operation for a management device to route traffic onto a network.

FIG. 4 is a flowchart illustrating an example mode of operation for a management device to route traffic onto a network. Operation 300 is described with respect to controller 52 of FIG. 1 but may be applied by a decentralized control plane made up of multiple controllers or router control planes, for instance. Topology computation module 58 initially pre-processes a list of traffic demands to collate the list of traffic demands to be routed according to source node (e.g., one of routers 4) (302). For each source node, topology computation module 58 reviews the corresponding collated list to identify a list of destinations (e.g., any set of routers 4) for the source node (304).

Then, for each source node, topology computation module 58 computes at least one shortest path from the source node to each destination in the list of destinations in the source node (306). Topology computation module 58 may leverage the characteristic of an applied "open" shortest-path first (open SPF) algorithm that takes a similar amount of time to find the paths from a node to a single node as it does to find the paths from the node to all of the nodes. This takes advantage of the pre-processing steps 302, 304. Topology computation module 58 may in some cases use multiple cores (e.g., of multi-core computing platform 111 of FIG. 2) to execute multiple parallel threads to perform step 306. Computing shortest paths for each source node to its associated destination list is an independent operation and, thus, each of the multiple threads may independently compute shortest paths for different subsets of the set of various source nodes. For example, the pre-processing steps 302, 304 may result in a queue of source nodes, each source node requiring the computation of shortest paths, and the multiple threads may dequeue source nodes from the queue for processing to collectively perform step 306. To ensure synchronization, each source node may be associated with a mutex or other synchronization primitive. Additional details regarding computing constrained shortest paths and multi-threaded computation of shortest paths generally are found in David Wood, U.S. patent application Ser. No. 14/500,736, filed Sep. 29, 2014 and entitled "Batched Path Computation in Resource-Constrained Networks," which is incorporated by reference herein in its entirety.

In some cases, the at least one shortest path may include multiple equal-cost multipath (ECMP) paths. To find multiple ECMP paths taking different routes through the network the topology computation module 58 may invoke the shortest path algorithm several times and achieves different paths by swapping the link and path search order (additional example details described below with respect to FIG. 5). Having computed shortest paths, topology computation module 58 then routes the flows representing the traffic demands onto the shortest paths (308). Topology computation module 58 adds the traffic to the links of the shortest paths and to the intermediate nodes for the shortest paths. Where ECMP paths are available, topology computation module 58 may recursively split the traffic flows over the available ECMP paths, allocate traffic to the various paths by this recursive algorithm, and route the split traffic flows onto the network.

Figure 5:
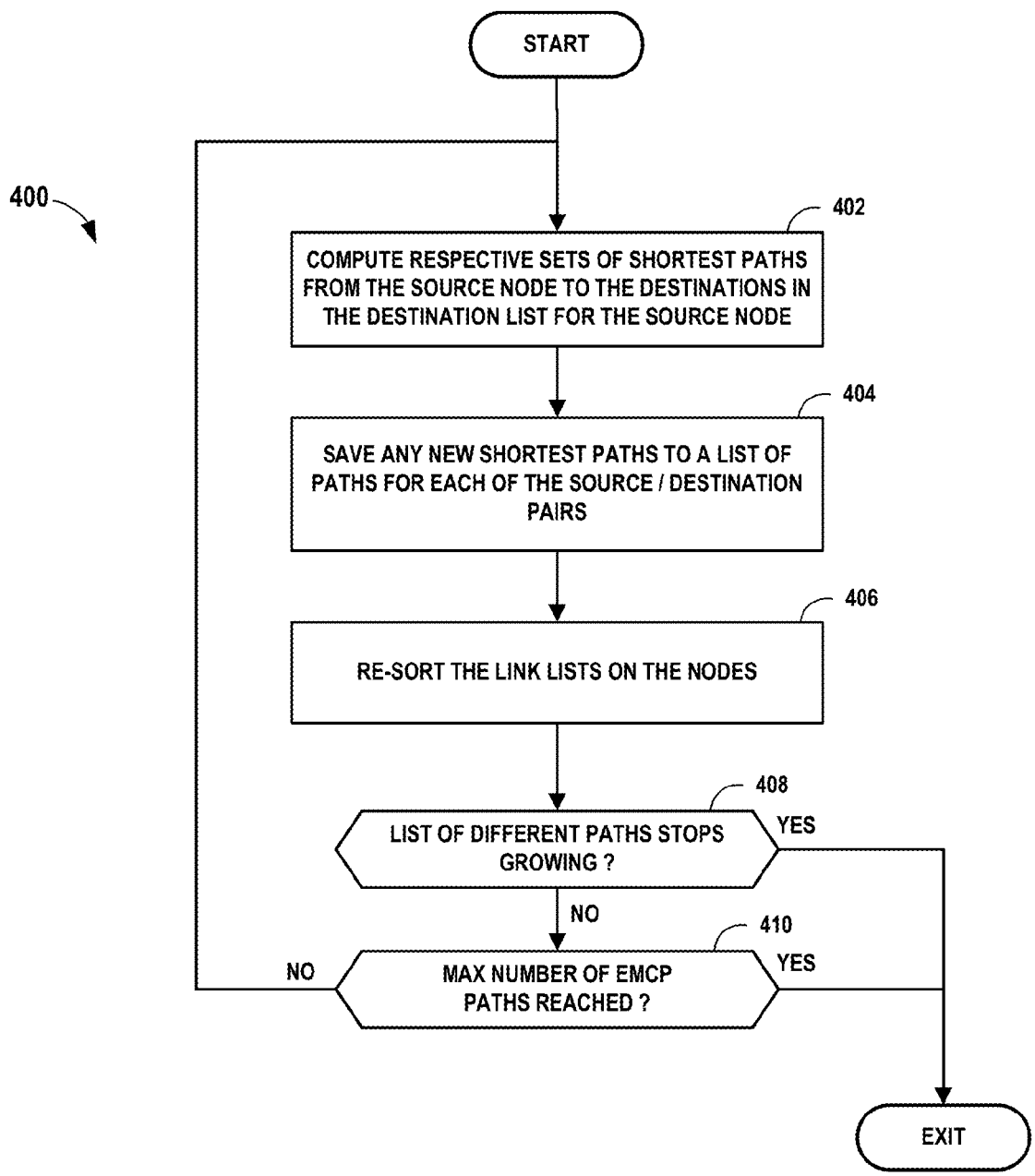
FIG. 5 is a flowchart illustrating an example mode of operation for determining multiple equal-cost multipath (ECMP) paths according to techniques described herein.

FIG. 5 is a flowchart illustrating an example mode of operation for determining multiple equal-cost multipath (ECMP) paths according to techniques described herein. Mode of operation 400 may be an example implementation of at least part of step 306 of operation 300 of FIG. 4, and operation 400 is described with respect to controller 52 of FIG. 1.

The raw shortest path algorithm applied by topology computation module 58 finds the paths in the order of the links sorted on the nodes. Accordingly, if the links are re-sorted such that links with identical metrics appear in a different order, then the paths found will be different. The first time a re-sort is invoked, the order of links with the same metric is simply reversed. After the first invocation the order is randomly shuffled.

The other ordering in the shortest path algorithm comes from the order in which the list of nodes already connected is searched. As applied by topology computation module 58, this list of nodes is randomly shuffled and when a new connected node is found, it is placed in a random position in that list. Hence the shortest path algorithm will find different paths each time the algorithm is invoked, if there are ECMP paths associated.

Thus, topology computation module 58 iteratively computes shortest paths for the source nodes and re-sorts the various lists. The first step in the iteration is to compute at least one shortest path from the source node to each destination in the list of destinations in the source node (402). If any new shortest paths are identified, topology computation module 58 saves these are new ECMP paths for the source node (404). Topology computation module 58 may then re-sort the order of links sorted on the nodes and the ordering of the list of nodes already connected (406). Topology computation module 58 iterates around the loop until the list of ECMP paths for the source node stops growing (YES branch of 408) or a maximum number of ECMP paths is identified (YES branch of 410). The maximum number may be 5, 10, 12, or 15, for instance.

At this point, traffic demands have a list of ECMP paths associated with them. The ECMP load-balancing algorithm in the routers 4 of network 6 will split the traffic evenly across each branching path. Topology computation module 58 applies a recursive model of the above to allocate the traffic for a demand on each branching path to mimic this behavior.

An example shortest-path first algorithm for step 402, above, is provided in pseudocode as follows. The algorithm acts on arrays local to each node:
    double * distanceCosts;
    unsigned * routeMarks;
    unsigned * searchEntryPoints;
    unsigned * localDestinationMarks;
    Node ** connectedNodes;
    Path * pathTable;

The above local arrays could in some cases be pointers to the links or nodes themselves or iterator pointers in the lists, for example.

Initialize the algorithm:
Unset the routeMarks, search EntryPoints, etc.
Set the distances in the array and path table to a large number (FLT_MAX).
Mark the nodes in the destination list as special (the algorithm finishes when all are routed).
Inner Loop:

```
while (connectedNodeCount < nodeCount) {
        reset the minCost to a high number (FLT_MAX)
        unset the nearestNode pointer
        loop over the nodes already connected {
                currentNode = connectedNode[i];
                loop over the links attached to the currentNode {
                        (starting from the last link used on that node)
                        Find the other node attached to the link
                        if(node already connected)
                        { increment the search entry pointer for the last link used on that
                        node }
                        else {
                            Calculate the "metric distance" to this node from the distance
                            to the connected node plus the link metric.
                            If this distance is lower than the current minimum then {
                                Update the minDistance
                                Keep track of the connected node and the link used
                            }
                        // break out of the inner loop -- by definition the next link is the next-
                        nearest neighbor so no need to search further
                        }
                }
        }
}
```

The nearest neighbor node from the inner loop is now the next node to be connected
Connect the nearest neighbor node.
  Set the path equal to the path to the connected node plus the link to it.
  Add to the connected node list.
    //put this into the list in random order so that different ECMP paths are found if the method is repeatedly called
  If the new neighbor is in the destination list then mark it as done.
  If all the nodes in the destination list have been reached, exit the loop.

Note that this algorithm appears to have 3-nested levels. However the innermost loop only iterates from the last link used on that node to the first neighbor not yet connected. Hence it typically only loops 1 or 2 times and the algorithm complexity is thereby reduced.

This algorithm using sorted links may provide a large speed up for the situation in which a node will have (at least in principle) a large number of possible links to use. For straightforward routing calculations on "normal" networks in which a node will typically only have a few neighbors there is some speed-up but the advantages may not be as substantial. Even so, the use of batch processing to find the routes to a list of destinations from a single source node will speed up the open-shortest path calculation in all circumstances.

As noted above, topology computation module 58 in above examples perform open SPF (interior gateway protocol (IGP)) routing computations and then set the capacity requirements on the network components based on this open routing. In some cases, path determination may instead or additionally use constrained SPF (CSPF) to design the network capacity requirements for a set of LSPs requiring with CSPF-based routing. In such cases, topology computation module 58 may modify the network topology model by modifying maximum capacities of the candidate links (or nodes) for network 6 rather than by simply blocking or unblocking. Topology computation module 58 may apply batched path computation techniques described in Wood, U.S. patent application Ser. No. 14/500,736, incorporated above, to perform CSPF computations in some cases.

Figure 6:
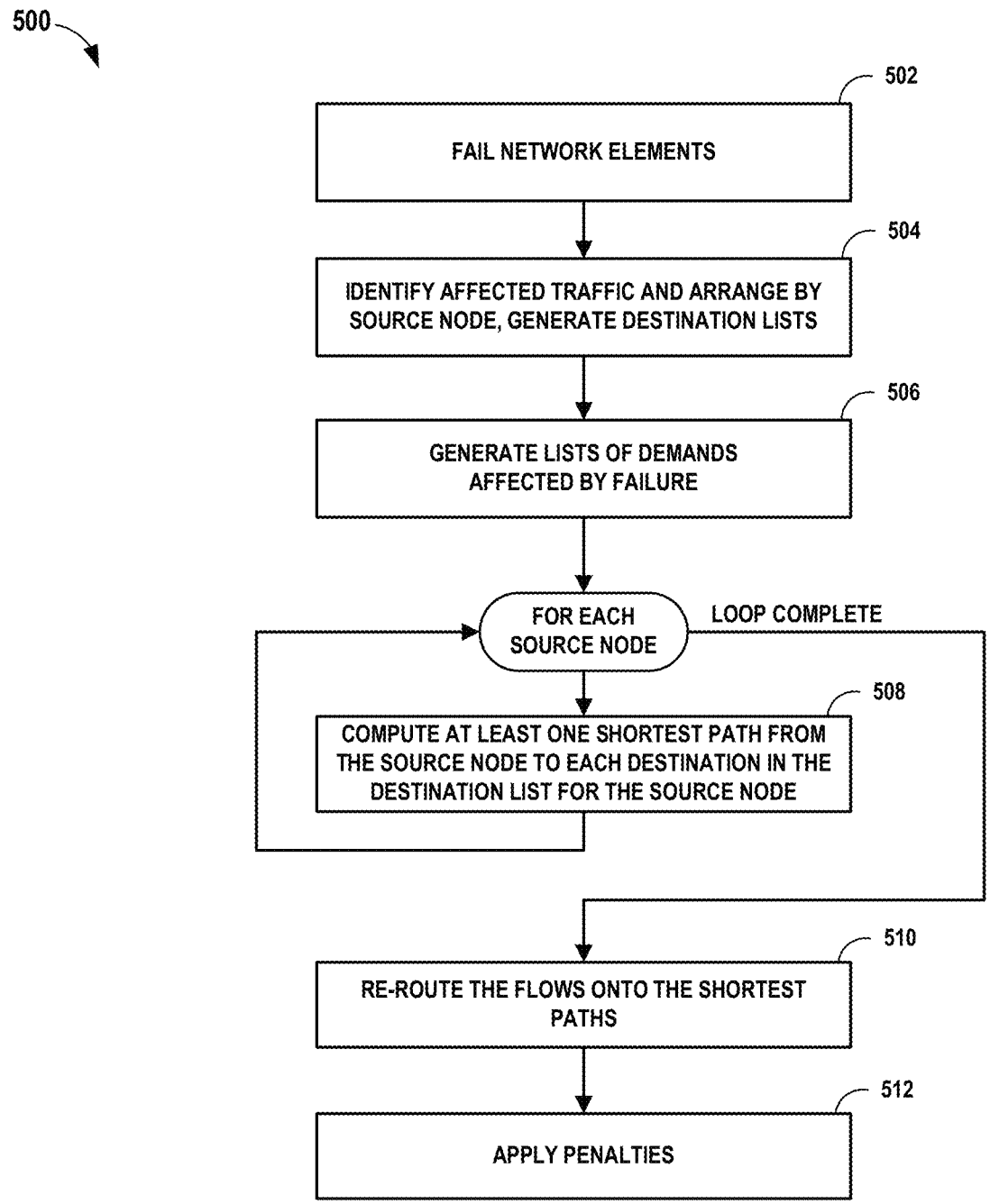
FIG. 6 is a flowchart illustrating an example mode of operation for failure simulation according to techniques described herein.

FIG. 6 is a flowchart illustrating an example mode of operation for failure simulation according to techniques described herein. Mode of operation 500 may be an example implementation of at least parts of steps 204, 206 of operation 200 of FIG. 3, and operation 500 is described with respect to controller 52 of FIG. 1A but may be performed by network management system 53 of FIG. 1B. In operation 500, topology computation module 58 determines the worst-case traffic level on the link and through the nodes, and topology computation module 58 uses this level to set the dimensions of the links and size of the nodes based on the through traffic routed to them.

Topology computation module 58 fails, in turn, multiple components for multi-layer network 60 (502). For example, topology computation module 58 may fail each candidate link used to route traffic for the solution, each of routers 4 through which traffic has been routed, each transport link (or SRLG if candidate links obtained as abstract links), each transport node (if known), and each site. The types of components failed may by be configurable by the network operator for network 6. For each failed component, topology computation module 58 identifies the affected traffic, arranges the affected traffic by source node, and generates destination lists for each source node (504). Topology computation module 58 generates lists of demands affected by the failure (506). For traffic originating or terminating at a failed node, topology computation module 58 may remove the traffic from the routed network model. For traffic passing through a failed component, topology computation module 58 attempts to re-route the traffic.

To re-route, topology computation module 58 determines shortest paths to destination for each affected source node (508). Step 508 may be similar to step 306 of FIG. 4.

Topology computation module 58 re-routes the affected flows onto the shortest paths (510). Such re-routing may include recursively splitting re-routed traffic flows over available ECMP paths, routing the split traffic flows onto the network model, adding the traffic to the links and to intermediate nodes. In addition, topology computation module 58 may store data describing the worst-case traffic levels through the network model on the links and through the nodes (these may define the dimensions for these elements). Topology computation module 58 may also add a penalty for traffic that cannot be re-routed because of the failure (512). Operation 200 may incorporate all such penalties into the total cost for the solution.

FIGS. 7-9 depict charts illustrating intermediate and final parameters and results during an example run to determine a network topology for a network according to techniques described in this disclosure. Candidate links used in the run to determine a network topology may include unfiltered candidate links or filtered candidate links. The charts are merely illustrative. FIG. 7 depicts chart 600 showing a target ratio 602 set by topology computation module 58 with the target probability that the value target ratio 602 for a given iteration will result in a cost increase. In this example, the initial target ratio for iteration 1 is set to 10%, and at the end the target percentage is set to 0%. During the iteration the target percentage is reduced linearly as the iteration progresses. For instance, every N iterations, topology computation module 58 will check the actual percentage of changes (depicted in chart 600 as actual ratio 604) that increase the cost and check this against the target value. If the actual percentage is too high, then topology computation module 58 will decrease the temperature parameter T for the simulated annealing function. If this actual percentage is too low then topology computation module 58 will increase the parameter T.

FIG. 8 depicts chart 610 of the temperature parameter T for the simulated annealing function for an example run to determine a network topology for a network according to techniques described in this disclosure. Chart 610 illustrates an erratic yet downward trend as topology computation module 58 adjusts the value of T to attempt meeting the target ratio 602 depicted in chart 600 of FIG. 6.

FIG. 9 depicts chart 620 illustrating intermediate and final total costs determined during an example run to determine a network topology for a network according to techniques described in this disclosure. Current total cost line 622 illustrates the total costs determined by topology computation module 58 for iterations of the algorithm. Best total cost line 624 illustrates the total cost for the lowest cost solution obtained by topology computation module 58 up to that point. Notably in this example, the initial iteration results in a best total cost that is not reached again until much further along in the run (after iteration ~55,000). The solution in fact drifted to a significantly higher cost at first. The large discrepancy between the current total cost and the best total costs illustrates the importance of storing the best solution yet identified during the course of a run.

Figure 10:
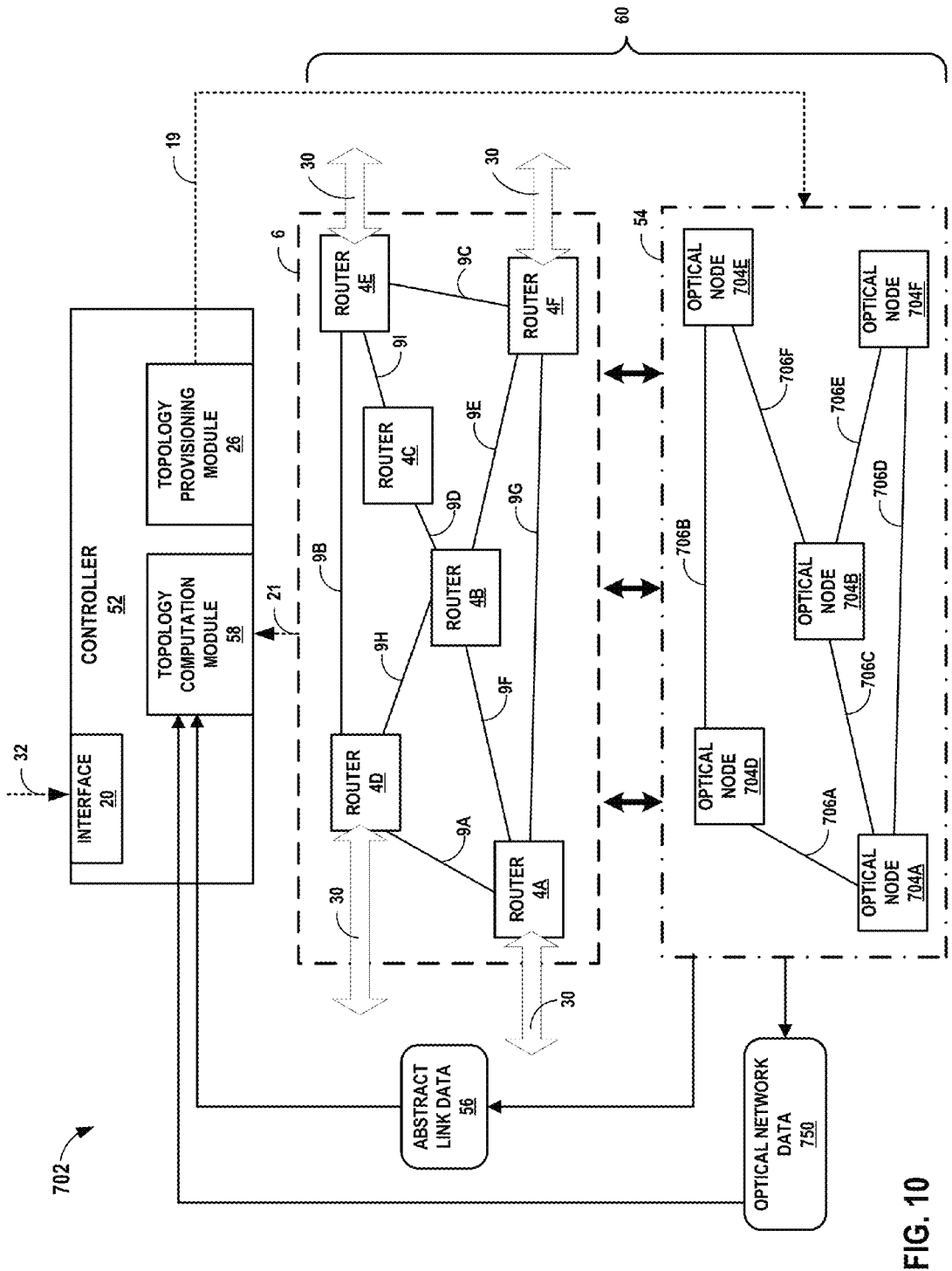
FIG. 10 is a block diagram illustrating an example network system in which a management device obtains abstract link data and optical network data for a multi-layer network and uses the abstract link data to determine logical links for a logical network layer in the multi-layer network based on filtering candidate links using the optical network data, in accordance with techniques described in this disclosure.

FIG. 10 is a block diagram illustrating an example network system in which a controller obtains abstract link data and optical network data for a multi-layer network and uses the abstract link data to determine logical links for a logical network layer in the multi-layer network based on filtering candidate links using the optical network data, in accordance with techniques described in this disclosure. Network system 702 may represent an example instance of any of network systems 50, 51, with transport network 54 illustrated in further detail to include optical nodes 704A-704F (collectively, "optical nodes 704") interconnected by optical fibre links 706A-706F (collectively, "fibre links 706"). In the illustrated example, each of optical nodes 704 is associated with one of routers 4 of network 6. For example, optical nodes 704 may couple to respective routers 4 via grey optics, in which a router exchanges grey (uncolored) optical signals with a transponder that converts between a grey optical signal and an optical signal at a specific wavelength (color) exchanged with a WDM device. In some examples, one or more pairs of optical nodes 704 and routers 4 may be integrated, e.g., a router having integrated transponders for converting between optical and electrical signals and an integrated optical cross connect (OXC) or WDM device. In some examples, one or more optical nodes 704 do not include an interface with any of routers 4. Such optical nodes may represent OXCs that switch lambdas for optical paths.

In some examples, multi-layer network 60 may include any combination of any of the following architectural models: (1) optical transport network (OTN) layer added to network layer 6 (bypass model); (2) optimized hybrid MPLS+OTN topology; (3) MPLS-only packet transport network; and (4) OTN-only circuit transport network.

Each of optical nodes 704 may represent a PCX, WDM/DWDM device, TDM-based devices, OXCs, OADMs, ROADMs, multiplexing devices, or other types of devices or other devices that transmit, switch and/or multiplex optical signals. Topology provisioning module 26 and/or an administrator of transport network 54 configures optical nodes 704 to switch optical signals along optical paths, each optical path beginning at an optical transmitter and terminating at an optical receiver and each of the optical transmitter and optical receiver being associated with a different one of optical nodes 704 that includes an interface to one of routers 4. In this way, routers 4 may exchange packets via optical paths. An optical path may alternatively be referred to as an optical path, a light path, a lambda, or an optical transport network wavelength. Example bandwidths for an optical path may include, e.g., 2.5 Gbps, 10 Gbps, 40 Gbps, 100 Gbps, or 400 Gbps.

Each of optical nodes 704 and fibre links 706 exhibits characteristics that affect the optical signal received at an optical receiver for an optical path that includes such optical nodes 704 and fibre links 706. In other words, the optical signal received at the receiver may be affected by impairments including transmission and optical switching characteristics of the optical equipment and therefore differs from the optical signal transmitted at the optical transmitter. The following are examples of impairments and optical transmission properties/phenomena that can affect the integrity of an optical signal and determine whether an optical receiver selected for an optical path is capable of accurately converting the optical signal to an electrical signal for transmission to one of routers 4 and routing in the routing layer topology.

Chromatic dispersion (CD) is a property of the glass medium in fibre links 706. Because the index of refraction in the glass medium is a function of the wavelength of light, lower frequency wavelengths travel through glass at a different speed than higher frequency wavelengths, which causes smearing of the transmitted signals in the various wavelengths. Transport network 54 may include dispersion compensation components to reduce or remove the chromatic dispersion on one or more of fibre links 706. Such dispersion compensation components may be integrated with an inline amplifier. However, such compensation is typically imperfect and at least in such cases chromatic dispersion remains a property of each fibre link 706. The chromatic dispersion value for an optical path is a cumulative property of the fibre links and devices that makes up that and therefore accumulates linearly through the contribution of the fibre links 706 for the optical path and the contribution (positive, negative, or insignificant/zero) of other optical equipment, such as components of the optical nodes 704, that in part make up the optical path. For the optical systems calculations the chromatic dispersion can be set as a limit so that if the dispersion is outside this range the link is considered unusable—or as an additional impairment component to the overall Noise Factor figure. Because the chromatic dispersion can be positive or negative, it is possible that, e.g., a positive value for the chromatic dispersion above some limit can be compensated by adding a component to add negative dispersion to take the overall values below this limit.

Polarization mode dispersion (PMD) and polarization dependent loss (PDL) result from birefringence of the fibre and orthogonally-polarized optical signal transmission. PMD causes spreading of optical pulses into adjacent bit periods and overlap. PDL is a measure of the peak-to-peak difference in transmission for light with various modes of polarization. PDL is typically defined as a ratio of the maximum and the minimum transmission of an optical device or fibre link with respect to all polarization states. Optical couplers, isolators, wavelength-division multiplexors, and photodetectors commonly exhibit PDL. For the optical systems calculations the PMD, PDL, and/or CD values can be set as a limit so that if they lie outside the tolerances the link is considered unusable. Alternatively or additionally these impairments may be considered as an additional impairment component to the overall Noise Factor/OSNR figure.

The optical signal-to-noise ratio (OSNR) represents an amount of noise in an optical signal. As with electrical signals, amplification of an optical signal amplifies both the signal and the noise, while attenuation of both the signal and the noise along a fibre applies more significantly to the signal. The OSNR of a signal therefore diminishes along the fibre transmission medium. Each of fibre links 706 has a different OSNR value is dependent on fibre link length and quality.

Given the fibre types on a fibre link 706 and the length thereof, controller 52 may determine the signal power loss of a section, as well as the chromatic dispersion and the polarization dispersion values (e.g., PMD and PDL). Each fibre section may include an inline amplifier to compensate for these losses (with the gain set equal to the section loss). This inline amplifier could be either a separate device specifically for the amplifier task or a pre-amplifier before the transponders or the wavelength bypass on the optical node 704. The inline amplifier can also be integrated with dispersion compensation components to reduce or remove the chromatic dispersion on the fibre section. The amplifier gain introduces an additional noise factor to the OSNR, which may be determined by the controller 52 from the inline amplifier gain setting and the data sheets for the inline amplifier.

For a given fibre link of fibre links 706, the controller 52 may determine the signal power loss, chromatic dispersion, PMD, and/or PDL. In addition, controller 52 allocates the lowest-cost amplifier able to provide the required gain to compensate for the loss. In some examples, if it is not possible to compensate for the loss then controller 52 selects the highest-gain amplifier and configures the amplifiers with the maximum possible gain. Controller 52 may then determine the contribution to the overall OSNR from the noise factor introduced by the amplifier gain, using information determined from the amplifier data sheet. In this way, controller 52 may dynamically determine a contribution to OSNR for the fibre link. In examples and for a 0.1 nm reference wavelength, controller 52 may determine the contribution using the following formula:

$$OSNR\left(\frac{dB}{0.1}\right) = C - NoiseFactor(\text{amplifier gain}) - Gain + rx\_power$$

where C is a configurable constant, NoiseFactor(amplifier gain) represents a noise introduced by the amplifier based on the amplifier gain, and Gain represents the amplifier gain. rx_power represents the optical power at the receiver. Moreover for the fibre link and in some examples, controller 52 determines the PMD and/or PDL for the fibre link. In some examples, controller 52 may additionally account for dispersion compensation.

In order to determine the values of optical path impairments, controller 52 obtains optical network data 750 for optical transport network 54. Optical network data 750 includes data descriptive of the optical equipment of optical transport network 54 and usable by controller 52 to determine the values of optical path impairments. As described in further detail below, based on the optical path impairments and optical receiver tolerances for available optical receivers at an optical path termination, the controller 52 may determine the candidate links for routing in the network 6 that have feasible optical paths. Controller 52 filters the candidate links that do not have feasible optical paths from the optimization algorithm, if effect preventing such candidate links from being considered. Rather, the controller 52 applies the optimization algorithm only to the set of filtered candidate links that controller 52 has determined have feasible optical paths.

In other words, controller 52 may use optical systems calculations on 'potential-links' to filter out links that are infeasible because of their optical properties before attempting the main optimization logic. Controller 52 may remove, from the network graph, links that are infeasible in terms of their optical properties, and the optimization process works from this reduced set of links. In this way, it is possible to enter in the details of fibre properties, amplifiers, transceivers, multiplexers, etc. that are available for a design and both perform optimization calculations to determine the optimal network topology, taking into account this data. It also becomes possible, using techniques described herein, to investigate how specific properties of the available optical components affect the overall network design and their cost implications on a network scale. This information on the components can be based on data sheets provided by the manufacturer or on measurements provided for the live network to the management software. Because the chromatic dispersion can be positive or negative, it is possible that a positive value for the chromatic dispersion above some limit can be compensated by adding a component to add negative dispersion to take the overall values below this limit.

Optical network data 750 may include the following, non-exhaustive, list of descriptive data for optical equipment of optical transport network 54:

The fibre topology, including availability of switching among fibre links 706 at optical nodes 704.

For each fibre link 706:
  Fibre length, PMD, PDL, chromatic dispersion (dispersion loss characteristics may be expressed per unit of length).

For each optical node 704, characteristics of the optical components including receivers, transmitters, converters, transponders, integrated amplifiers, photonic switches, etc. Such characteristics may include tolerance to impairments on an optical transport path, including tolerance values to PMD, PDL, chromatic dispersion, OSNR tolerance, and so forth.

Locations of each of routers 4 and association between routers 4 and optical nodes 704.

Characteristics of each of routers 4.

Optical equipment prices/costs.

This information on the components can be based on data sheets provided by the manufacturer or on measurements provided for the live network to the management software. Abstract link data 56 is described elsewhere in this disclosure. Controller 52 receives traffic demands 32, abstract link data 56, and optical network data 750, and controller 52 based on the data determines a network topology having network links that have underlying feasible optical transport paths. Controller 52 may further receive, e.g., via interface 20, information regarding other constraints on multi-layer network 60 that the topology designer intends to use for a specific example. It is often a difficult task to obtain accurate data on the required end-to-end traffic represented by traffic demands 32. Data on the required end-to-end traffic may in some cases be provided by the customer and may in some cases be obtained by the provider by building a simple model for the traffic. A combination of such approaches may also produce traffic demands 32.

Controller 52 determines a topology of network 6 and a topology of underlying optical transport network 54 to facilitate carrying the required traffic at a minimum total cost. As noted above, controller 52 determines the equipment and components needed and, in response to executing the optimization algorithm, outputs a detailed design for at least one of the optical transport network 54 and the network 6. The output may in some examples be one or more spreadsheets, a database, a set of instructions, a detailed bill of materials with which the network operator can implement the topology, among other examples. In doing so, controller 52 may facilitate an optimized total resource cost to the network for transporting the traffic to satisfy traffic demands 32.

As described above, topology computation module 58 obtains a set of candidate links for network 6 and applies a topology optimization algorithm, such as the example algorithm described in this disclosure, to obtain the set of candidate link for a topology solution that topology provisioning module 26 may provision into multi-layer network 60. For instance, topology computation module 58 may start with a mesh of candidate links for the IP/network layer to use for the design. These candidate links could, e.g., represent a "full-mesh" of links between all the routers 4 or a hierarchical partial-mesh. For a hierarchical partial-mesh, the candidate links may represent a topology in which all nodes within a metro-region can connect, while the core-nodes connect via long-distance connections). Alternatively, the set of candidate links may be user-defined. In general, the particular topology of the exact mesh of candidate links is not critical so long as it is possible to connect all of routers 6.

Topology computation module 58 determines paths through optical transport network 54 for at least some of the candidate links (again, candidate links represent IP/network layer links in network 6). According to one example network model for controller 52, a pair of routers 4 that are located in the same site (e.g., a same warehouse, metropolitan area, or otherwise geographically proximally located) can connect directly without reliance on the optical transport network 54 to transport packets for the candidate link connecting the pair. However, where the pair of routers 4 are in different sites, topology computation module 58 determines possible paths in the transport/fibre layer (i.e., through optical transport network 54). These paths are needed to understand the shared risks common to multiple candidate links as well as to calculate the optical properties to determine whether or not a candidate link is feasible. In some examples and as described in further detail above, topology computation module 58 will determine up to N possible paths for a candidate link. Each of these potential paths is considered a separate candidate link between a pair of routers 4 and having a unique optical path through the transport network 54. Multiple candidate links may thus have the same pair of endpoint routers 4 but different optical paths.

In the example of FIG. 10, topology computation module 58 additionally filters the candidate links by the optical constraints prior determining and optimizing a logical network topology using the filtered candidate links. In other words, topology computation module 58 determines, from the optical paths for candidate links, the candidate links having optical paths that are feasible before attempting to route traffic on the candidate links or perform applying further operations with respect to network topology computation. A candidate link having a feasible optical path may alternatively be referred to herein as a feasible candidate link. In this way, topology computation module 58 facilitates an optimized network 6 topology, for routing traffic demands 32, that includes those candidate links from the set of candidate links having feasible optical paths.

A network link 9 routed as a wavelength on an optical transport path through the optical transport network 54 could be routed as a direct connection between adjacent optical nodes 704 or, alternatively, may route through one or more active WDM/DWDM, OXCs, passive amplifiers (or other optical equipment). The wavelength OSNR changes along the path, as it accumulates noise; chromatic-dispersion and other degradations to the polarization characteristics.

Chromatic dispersion impairments for an optical path accumulate, as noted above linearly through the contributions from fibre link 704 and the contributions (positive, negative, or insignificant/zero) of other optical equipment, such as components of the optical nodes 704, that in part make up the optical path. Topology computation module 58 may determine a total chromatic dispersion impairment for an optical path according to equation (1):

$$\text{Total CD}=\sum_{i=1}^{K}\text{CD}(i) \qquad (1)$$

where K is the number of fibre sections and devices, and CD(i) is the value of a chromatic dispersion impairment for the $i^{th}$ section/device.

Polarization-dependent loss and polarization-mode dispersion impairments for an optical path accumulate as a diffusion process. In some examples, therefore, topology computation module 58 may determine PMD and/or PDL for an optical path as the square-root of the sum of the individual optical equipment contributions. For instance, topology computation module 58 may determine PMD according to equation (2):

$$\text{Total PMD} = (\Sigma_{i=1}^{K} \text{PMD}(i)^2)^{0.5} \quad (2)$$

where K is the number of fibre sections and devices, and PMD(i) is the value of a PMD impairment for the $i^{th}$ section/device. Likewise, topology computation module 58 may determine PDL according to equation (2):

$$\text{Total PDL} = (\Sigma_{i=1}^{K} \text{PDL}(i)^2)^{0.5} \quad (3)$$

where K is the number of fibre sections and devices, and PDL(i) is the value of a PDL impairment for the $i^{th}$ section/device.

Optical signal-to-noise ratio (OSNR) accumulates as the sum of the inverse OSNR contributions from the optical equipment along an optical path, typically expressed as a ratio rather than in decibels (dBs). An aggregate OSNR may be determined as an inverse of the sum of inverse OSNRs for individual optical equipment. Contributions to OSNR include those from the input transmitter and the subsequent gain on the multiplexor device entering the fibre, any inline amplifiers along the optical path, and the final demultiplexor stage and optical receiver.

In some examples, therefore, topology computation module 58 may determine a noise value based on the OSNR value (dB). For instance, determining a noise for a section/device as and using 0.1 nm as a reference wavelength:

$$\text{Noise} = 10^{(0.1 * OSNR(dB))} \quad (4)$$

Then:

$$\text{TotalNoise} = \Sigma_{i=1}^{K} \text{Noise}(i) \quad (5)$$

where K is the number of fibre sections and devices, and Noise(i) is the value of a noise value determined using Equation (4) for the $i^{th}$ section/device. The final OSNR in decibels may be determined as according to Equation (6):

$$\text{Final OSNR(dB)} = -10 \log_{10}(\text{TotalNoise}) \quad (6)$$

where TotalNoise is the value determined using Equation (5).

In some examples, therefore, topology computation module 58 may determine an aggregate OSNR for an optical path according to Equation (7):

$$OSNR_{total} = 1 / \sum_{i=1}^{K} \frac{1}{OSNR(i)} \quad (7)$$

where K is the number of fibre sections and devices, and OSNR(i) is the OSNR value of the $i^{th}$ section/device. Alternatively, K may represent the number of fibre sections alone, with OSNR(i) being the OSNR value of the $i^{th}$ section.

The final receiver selected for an optical path has respective tolerances to all of the impairments, as well as an OSNR minimum, in order to reconstitute the optically-signaled data as an electrical signal for switching in the network layer represented by network 6. In other words, the final receiver attempts to convert optical signals to electrical signals if it is possible to do so due to the optical signal having a quality insufficiently impaired by CD, PMD, and/or PDL so as to impair the conversion and having an adequate OSNR for conversion. In various examples, topology computation module 58 may consider the limits on chromatic dispersion, PMD, or PDL as separate limits for each of these parameters. Alternatively or additionally, infringements of these limits could instead be treated as an additional noise-impairment component and add to the overall Noise Factor/OSNR for the link.

Based on optical network data 750, for a given candidate link from the set of candidate links and having an optical path, topology computation module 58 attempts to identify an optical receiver having tolerances for which the impairments and OSNR determined for the optical path are acceptable. If a suitable optical receiver at the optical node 704 that terminates the optical path, topology computation module 58 may select the lowest-cost receiver that satisfies the various tolerances in view of the impairments and OSNR. The corresponding candidate link is 'feasible.' If no suitable optical receiver is available (e.g., exists) at the optical node 704, then topology computation module 58 removes the candidate link from the set of candidate links, which in effect forbids the link to be used for routing on the network topology. After filtering all candidate links that are not feasible from the set of candidate links, the topology computation module 58 retains a set of filtered candidate links each having a feasible optical path. In some examples, topology computation module 58 determines and reports the final OSNR values, and impairments for candidate links for troubleshooting purposes.

In some examples, topology computation module 58 may filter candidate links in other ways in addition to filtering based on optical characteristics. For example, a user requesting a network solution may set a limit to the number of routers 4 that a candidate link can bypass in the transport network 54. If this limit is set to zero, then only point-to-point connections between pairs of routers 4 are allowed. As another example, the user can forbid selected optical nodes 704 in the transport network 54 from passing wavelengths. If this "forbid" flag is set for an optical node 704, then all the wavelengths must terminate on the optical node 704 rather than being passed through. Accordingly, packet traffic on these wavelengths must be routed though one or more routers 4 connected to this (or through the IP routing engine aspect of the optical node 704 in an integrated embodiment).

Not all sets of routers 4 having routers located within geographical proximity of one another (a "site") need to connect into the transport layer for optical transport (e.g., for long-distance connections). Rather, in some examples, one or more routers 4 of a site may include an optical card having an optical interface and the remaining routers of the site connect to the routers having such an optical card, e.g., via router-layer links on grey optics. According to some models, topology computation module 58 may filter candidate links in these circumstances using any combination of the following filters: (1) if two routers 4 are in the same site, then the candidate links connecting the routers 4 need not be routed on through transport network 54 and thus topology computation module 58 need not apply filtering of candidate links based on optical characteristics; and (2) if two nodes are on different sites then only routers that connect into the transport layer are allowed to carry traffic.

In some cases, optical transport network 54 may include disjoint areas (i.e., no fibre links connect these areas). Topology computation module 54 may filter candidate links for which it is impossible to route the traffic, the endpoint routers 4 of such candidate links being located in disjoint areas of the optical transport network 54.

In some cases, at least some of optical nodes 704 may include optical equipment that can act either as terminal multiplexors or allow a subset of the wavelengths to pass directly through. For the node-bypass, this is allowed only between two fibres (e.g., East-West), and the cards cannot provide full optical connectivity except by terminating at the router layer and switching there. It is possible to have at least two pairs of such cards connecting to two sets of pairs of input fibres (e.g., East-West and North-South). In this case through-routing would be allowed East-West or North-South but not across these, i.e., not East-North. To connect East-North or other cross-wise routing would again require the wavelengths to terminate and the switching be carried out in the router layer. Topology computation module 58 may apply filtering to implement the above rules in addition to or alternate to the filter rules described above.

Having filtered the candidate links according to techniques described above to obtain a set of filtered candidate links each having feasible optical paths. The topology computation module 58 may apply techniques described above to facilitate an optimized network topology using the set of filtered candidate links as the set of candidate links for the network topology.

In some examples, topology computation module 58 assigns a routing metric to each of the filtered candidate links. For example, topology computation module 58 may determine the routing metric for a filtered candidate link using a simple hop+x*distance formula. Topology computation module 58 may then compute the shortest paths for the end-to-end traffic based on the set of filtered candidate links and the respective determined metrics (if there are equal-cost multipaths (ECMP) in the network, then topology computation module 58 will compute up to N different paths for the routing, where N=12 in some cases).

Topology computation module 58 may then place traffic demands 32 on the computed shortest paths. If there are ECMP paths in the network, topology computation module 58 may apply a recursive formula to place the correct proportions of traffic demands for an ECMP on the various paths onto network 6 made up of filtered candidate links.

Similarly to the algorithms described above with respect to FIGS. 3-6, topology computation module 58 performs failure simulations from a user-defined set of scenarios, including the failure of all routers 4, all network links 9, SRLGs, and so forth. Topology computation module 58 removes traffic demands 32 from failed elements, computes new paths if possible, and re-routes that removed traffic demands onto the modified network topology. Again, if there are ECMP paths, topology computation module 58 may apply a recursive formula to place the correct proportions of traffic demands for an ECMP on the various paths.

Topology computation module 58 may store worst-case traffic values on the network links 9 and dimension network links 9 and routers 4, as needed, based on the worst-case traffic values. Topology computation module 58 may determine the total network costs from user-defined input data on the costs of equipment, components, and interfaces, and return the total network costs to the requesting user.

Topology computation module 58 facilitates an optimized network solution by iteratively analyzing the set of filtered candidate links and abstract link data in view of the traffic demands 32 to select a subset of the filtered candidate links to efficiently and robustly carry the demands. As part of the controller 52 network design output, the topology provisioning module 26 may signal to the network (or the network operator) the information required to configure and activate any of these selected subset of filtered candidate links that are not already activated and configured.

More specifically, and similar to the techniques described above with respect to FIG. 3 and with the set of filtered candidate links, topology computation module 58 calculates paths and routes traffic demands 32; performs failure simulations; dimensions the network; and calculates the total cost for the solution. Topology computation module 58 then changes the network topology for the solution by, e.g., blocking or unblocking a filtered candidate link of the set of filtered candidate links. In this way, a network topology that is a possible solution includes a selected subset of the set of filtered candidate links. Topology computation module 58 again calculates paths and routes traffic demands 32; performs failure simulations; dimensions the network; and calculates the new total cost for the solution. Topology computation module 58 may use simulated annealing to determine whether to accept the new topology based on the new total cost and the previous total cost. As described above, if the modified network topology reduces the total cost then it is accepted. If the modified network topology increases the total cost then the change is accepted with some probability. If the change is rejected then the network topology is reverted to the state before the change. Topology computation module 58 iteratively performs the steps above to a specified limit, and as the iterations progress, the probability that a modification to a network topology solution that increases the total cost is gradually reduced. Topology computation module 58 in this way steers the network topology towards an optimum solution, thus facilitating an optimized network topology. However, topology computation module 58 may not in all cases obtain the global optimum.

Topology computation module 58 having determined a solution for multi-layer network 60, topology provisioning module 26 may signal, to transport network 54 (or to the network operator), determined network topology information 19 for routing the selected subset of filtered candidate links as demands in the transport layer represented by transport network 54. Network topology information 19 may include the selected subset of the candidate links. The selected subset of the candidate links may be expressed in network topology information 19 as a set of demands for the transport network 54.

Figures 11, 12:
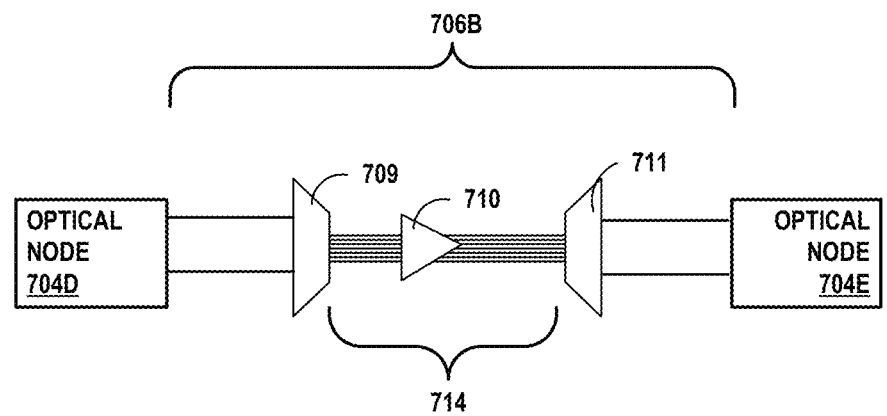
FIG. 11 is a block diagram illustrating, in further detail, a fibre link including optical equipment for switching lambdas on the fibre link, according to techniques described in this disclosure.
FIG. 12 is a table depicting impairment and optical signal-to-noise ratio values for optical equipment of the example fibre link of FIG. 11.

FIG. 11 is a block diagram illustrating, in further detail, a fibre link including optical equipment for switching lambdas on the fibre link, according to techniques described in this disclosure. In this example, fibre link 706B includes fibre 714 that may transport multiple wavelengths/lambdas added by wavelength-division multiplexing (WDM) multiplexer 709. WDM demultiplexer 711 separate wavelengths at the end of fibre 714. Inline amplifier 710 amplifies wavelengths being transported on fibre 714.

FIG. 12 is a table depicting impairment and optical signal-to-noise ratio values for optical equipment of the example fibre link of FIG. 11. Optical network data 750 may include a representation of table 720 as input data for topology computation module 58 to determine feasible candidate links from a set of candidate links. In the illustrated example, table 720 includes columns for PMD, PDL, chromatic dispersion (CD), and OSNR for the optical equipment. For example, demultiplexer 711 has OSNR value V1.

Figure 13:
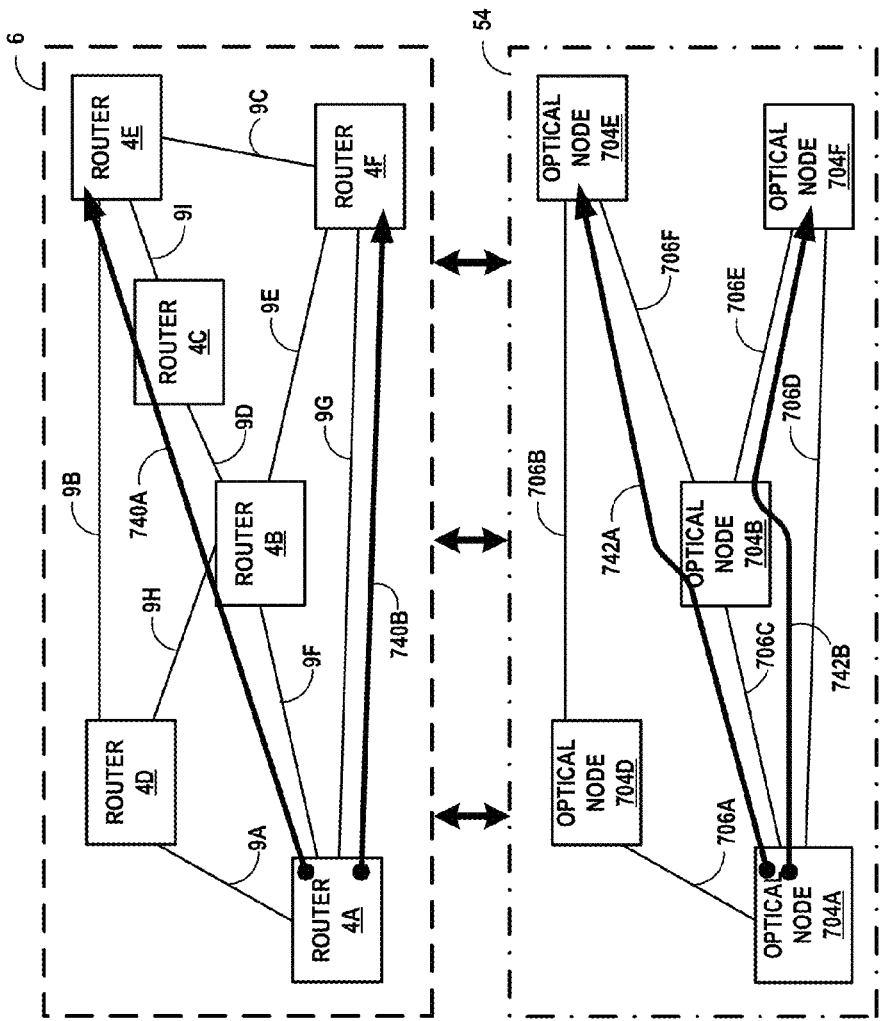
FIG. 13 is a block diagram illustrating example candidate links and optical paths for the candidate links determined in accordance with techniques described herein.

FIG. 13 is a block diagram illustrating example candidate links and optical paths for the candidate links determined in accordance with techniques described herein. In this example, topology computation module 58 determines candidate links 740A from router 4A to router 4E and candidate links 740B from router 4A to router 4F. Candidate links 740A-740B (collectively, "candidate links 740") may represent only a subset of the initial set of candidate links for determining a network topology solution for network 6.

Topology computation module 58 computes one or more optical paths for each of candidate links 740. In this example, optical path 742A for candidate link 740A proceeds from optical node 704A associated with router 4A to optical node 704B for optical switching to optical node 704E associated with router 4B. In addition, optical path 742B for candidate link 740B proceeds from optical node 704A associated with router 4A to optical node 704B for optical switching to optical node 704F associated with router 4F. Although only one optical path is shows for each of candidate links 740, topology computation module 58 may compute multiple potential optical paths for each candidate link. As described above, topology computation module 58 evaluates each potential optical path as a separate candidate link and, if the optical path is feasible, the candidate link is added to the set of filtered candidate links. Topology computation module 58 facilitates an optimized network using the set of filtered candidate links, according to techniques described herein.

Figure 14:
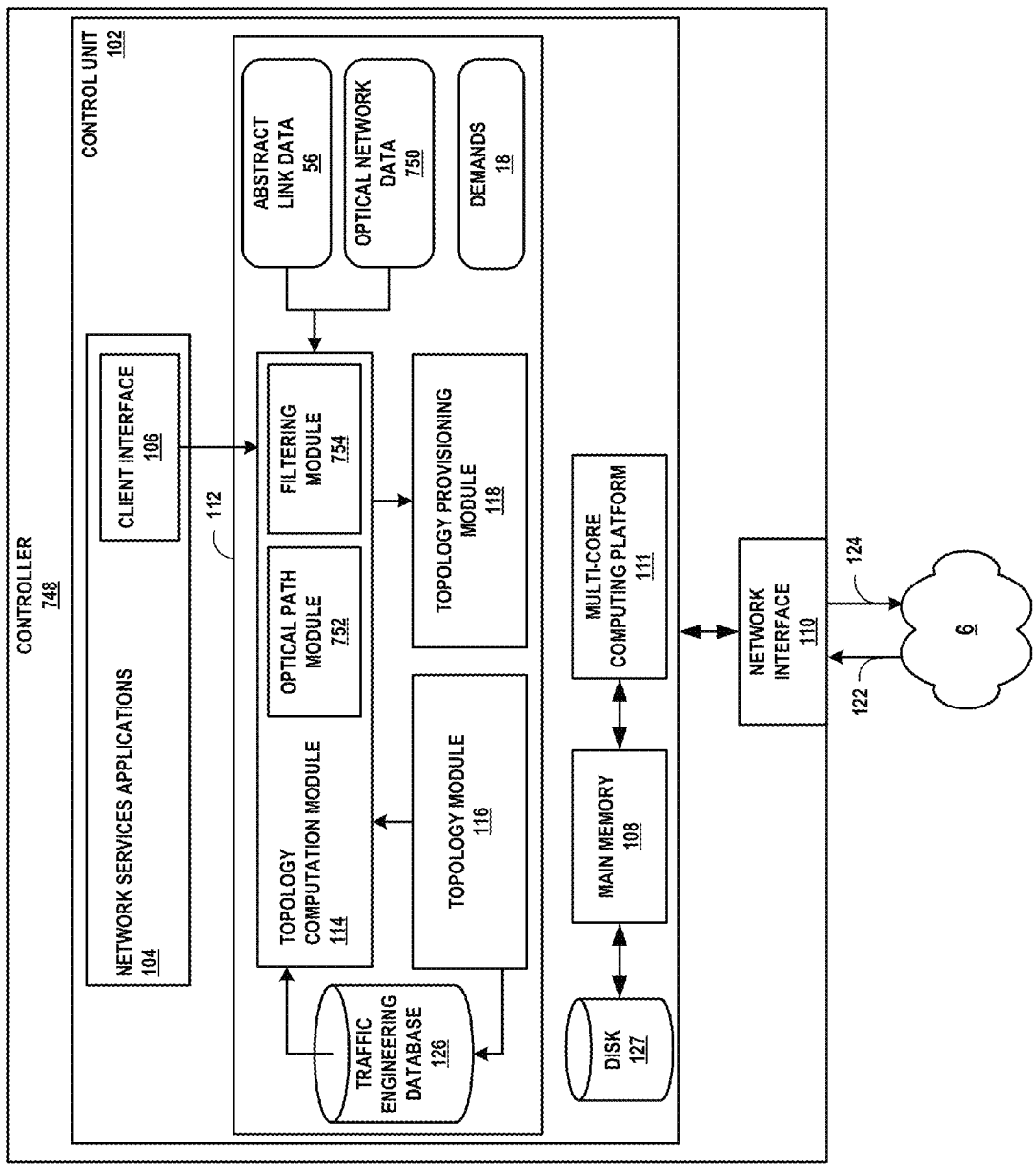
FIG. 14 is a block diagram illustrating, in further detail, an example management device configured to determine a logical network topology for routing traffic flows, in accordance with techniques of this disclosure.

FIG. 14 is a block diagram illustrating, in further detail, an example management device configured to determine a logical network topology for routing traffic flows, in accordance with techniques of this disclosure. While described with respect to a controller, the description is similarly applicable to a network management system. In response to receiving demands, controller 748 computes and outputs a logical network topology that meets the traffic demand matrix for the network 6.

Controller 748 may represent an example instance of controller 100 that determines feasibility of determined optical paths for candidate links prior to computing network topologies for a network solution. Topology computation module 114 includes an optical path module 752 that computes optical paths for candidate links for a network topology. Topology computation module 114 further includes a filtering module 754 that filters candidate links by determining the feasibility of the corresponding optical paths computed by optical path module 752. Filtering module 754 uses optical network data 750, which describes impairments and OSNR characteristics of optical equipment for transport network 54, to determine whether an optical path is feasible.

If an optical path for a candidate link is feasible, the combination of the pair of routers 4 that are endpoints for the candidate link for the network 6 and the optical path represent a feasible candidate link that can be used in a network topology solution computed by topology computation module 114.

Topology computation module 114 having selected and routed a subset of the candidate links for network 6, topology provisioning module 118 attempts to set the routed paths for the candidate links onto network 6. Topology provisioning module 118 of controller 100 may program the paths into network 6 to cause the state of network 6 to match the state of network 6 as determined by topology computation module 114. Topology provisioning module 118 may represent an example of topology provisioning module 118 of FIG. 2. Provisioning a path may require path validation prior to committing the path to provide for packet transport. Topology provisioning module 118 executes one or more southbound protocols for path provisioning to inject state into elements of network 6, such as any one or more of routers 4. A southbound protocol refers to a protocol by which components of controller 100 may communicate with network 6 elements, such as routers 4, to obtain or inject topology information, forwarding, and other network information that determines the operation of the network 6.

Figure 15A:
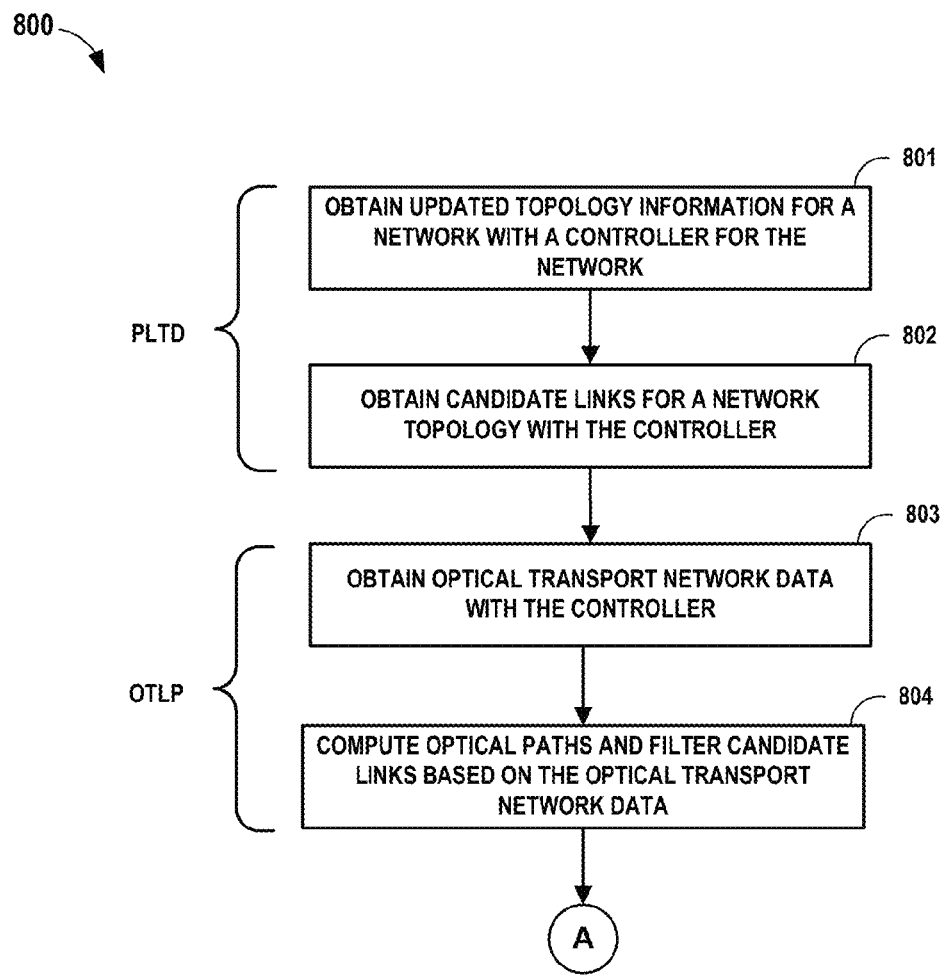
FIGS. 15A-15B depict a flowchart illustrating an example mode of operation for one or more management devices to determine and optimize a logical network topology according to techniques described in this disclosure.
Figure 15B:
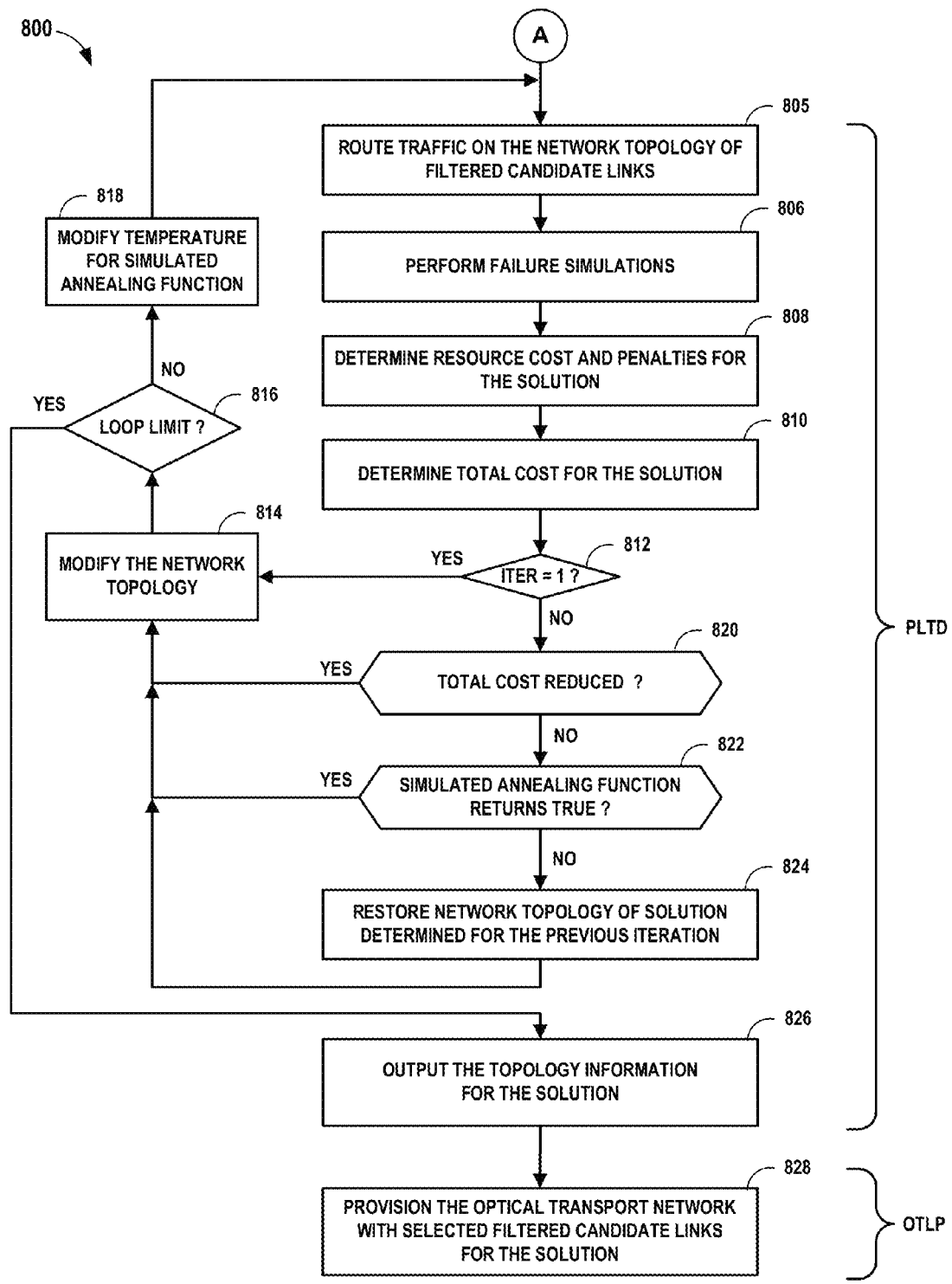

FIGS. 15A-15B depict a flowchart illustrating an example mode of operation for one or more management devices to determine and optimize a logical network topology according to techniques described in this disclosure. While described with respect to controller 52 of FIG. 10, operation 800 may performed by any of controller or set of controllers described herein, or by a network management system. Operation 800 includes steps for packet-layer topology design (PLTD) for the network/IP layer represented by network 6 and steps for optical transport layer planning (OTLP) for the optical layer represented or encompassed at least in part by transport network 54.

As part of a setup phase for PLTD, topology computation module 58 obtains input data including updated topology information for network 6 (801). Topology information for network 6 may include an existing topology for network 6 made up of routers 4 (and/or other network layer routing/switching nodes) and existing network links. Topology information may further include rules or conditions for any network solution. In some instances, topology computation module 58 obtains topology information that defines a network 6 hierarchy and allowed links between/among the access, core, and super-core portions of network 6. Topology computation module 58 uses the topology information to generate a set of candidate links connecting pairs of routers 4 (802). For example, topology computation module 58 may generate a set of candidate links from the hierarchy rules and existing links specified by a user requesting a solution.

Topology computation module 58 may alternatively or additionally receive abstract link data 56 that includes information describing candidate links. In some cases, abstract link data 56 is a file built as a data extraction from a third-party network management system for the transport layer. In some cases, a network operator for network 6 may build such a file by applying a script to or otherwise manipulating available transport layer data. Obtaining candidate link information directly in this way from abstract link data 56, e.g., provides only an abstract or restricted description of transport network 54 that does not include details of the transport layer topology. As a result, topology computation module 58 may apply more complicated constraints for determining selected candidate links. For example, a network operator may specify maximum counts, maximum delay, maximum capacity on any group of links, or SRLGs (or any combination thereof). Topology computation module 58 may apply such constraints to topology determination for network 6, where such constraints are "soft-constraints" in that solutions that violate the requirements of the constraints are not forbidden but rather receive a penalty cost that is added to the total network cost (topology computation module 58 iteratively applies steps of operation 200 to determine solutions that reduce or bring to zero these penalties).

The determined solution typically does not use all candidate links obtained, and controller 52 applies operation 800 to determine the subset of candidate links to use to facilitate and build a lowest cost network topology. The candidate links are an input to the next OTLP phase. Topology computation module 58 obtains optical transport network data 750 ("optical network data 750") for transport network 54 (803).

Topology computation module 58 may route the candidate links in transport network 54 using optical network data 750 to determine their actual physical lengths and the shared-risks (SRLGs) that the newly-built links encounter in their paths in the transport layer. In some cases, these paths are pre-computed when the calculation starts. To compute the paths, topology computation module 58 may calculate three paths and the optimisation algorithm is free to choose between these:

4. Shortest path
5. The shorter of the two paths on a calculated "shortest-diverse-cycle"
6. The longer of the two paths on a calculated "shortest-diverse-cycle"

Often the first two paths of these paths are identical but this is not necessarily the case. Topology computation module 58 may apply a "strong" diverse path algorithm that works well to find shortest diverse-cycle paths in complicated networks taking account of SRLG information if available. More generally, topology computation module 58 may determine N "non-identical", non-looping transport layer paths within some bound of total path-metric from the shortest/shortest-cycles paths. These N will be filtered later by the optical systems calculations according to techniques described herein. For example, topology computation module 58 may determine seven "reasonable" transport layer paths—the shortest path; two paths from the shortest cycle and four others different to these paths and to each other (for instance, within some limit of metric-distance to the base set of the shortest path and two paths from the shortest cycle). As described herein, topology computation module 58 may then filter these paths based on the optical constraints, resulting in K<N useable paths. These K paths are then treated as feasible candidate links for the main optimisation algorithm. If a logical-link already exists and its path in the transport network 54 is known, then this can be read into topology computation module 58 and the known route can be fixed—and the diverse-path set described above is not determined.

In some cases, because such paths for an existing logical-link are all pre-calculated before the applying operation 800, topology computation module 58 may not attempt to design the paths taking into account available wavelengths in the transport network 54. Topology computation module 58 instead assumes in such cases that the WDM capacity does not limit the design. Alternatively, the computation module may have information on the WDM resource constraints (e.g., obtained from abstract link data 56) and apply penalties to a solution if the solution does not meet these constraints. Once the path is selected, topology computation module 58 maps these paths to SRLG information for the IP links carried over each transport network 54 link section or node. Related to the transport paths, topology computation module 58 may in some instances have a user-configurable parameter for pruning the set of candidate links based on the number of IP nodes the links "bypass" in the transport layer. This allows the candidate link set to be reduced on the basis of the transport link topology and the equipment passed rather than on the basis of distance, for example.

Using the optical network data 750, controller 52 determines aggregate impairments and aggregate OSNR for optical paths for the candidate links Based on optical receiver tolerances for these quantities for optical receivers of optical nodes 704 that terminate the optical paths, topology computation module 58 filters those candidate links that do not have feasible optical paths to obtain a set of filtered candidate links (804).

Information describing the candidate links may include available links and associated link metrics, link costs, and/or SRLGs on the link. The combination of live topology information 21 for network 6 and the obtained filtered candidate links define a network topology model for network 6. Topology computation module 58 routes the traffic demands for network 6 on the network topology model made up of a subset of the set of filtered candidate links (805). Example detailed operations for routing traffic demands are described elsewhere in this disclosure.

Topology computation module 58 then performs failure simulations with respect to the solution represented by the current network topology model including the current subset of filtered candidate links over which topology computation module 58 has routed any of the traffic demands (806). The failure simulations determine penalties to be applied to the solution if, for instance, traffic cannot be protected, certain failure-resistance constraints are not met, or fixed equipment is required to exceed its constrained capacity in order to carry the traffic. Example details of a failure simulation are provided above with respect to FIG. 6.

Topology computation module 58 determines a resource cost to the network 6 for the solution and the penalties for the solution (in addition to those determined during the failure simulation) (808). To determine the resource costs for the purpose of optimization, topology computation module 58 determines a total resource cost of all the equipment in multi-layer network 60. Such costs may be based at least in part on link capacities (or "dimensions") needed to carry the traffic. The total resource cost formulas are operator-configurable, such that an operator may focus attention on a single measure of the network "costs" (such as total link "mileage" or "total interface count") or may use the formulas to gain a realistic measure of actual costs in order to form a fair comparison between different potential solutions. In some cases, the operation may add at least some component to the costs to reflect, e.g., that all else being equal "shorter-links" are better to use than "longer-links," etc. For instance, this may be reflected in the cost formula by adding a small component to the link costs that is proportional to distance. Such small changes to the cost formulas often make it very much easier for topology computation module 58 to identify an advantageous solution for large problems as topology computation module 58 can find some indication of the direction to steer the solution along the cost gradient. Topology computation module 58 in some cases may also attempt to do simple allocation of the node-equipment based on the number of links on the node and the traffic through it. As can be deduced from the above description, the optimum solution for a network where the costs are dominated by the interface (link) count will look very different to the optimum solution for a network where the costs are dominated by the link-mileage.

Topology computation module 58 additionally determines penalties for the solution. For example, the solution may violate one or more constraints having associated penalties. Such constraints may include, as noted above, maximum counts or maximum capacity on any group of links or SRLGs (or combination of the two). Topology computation module 58 may therefore determine which constraints are violated by the solution and apply the associated penalty. The failure simulations of step 806 may also accrue penalties for, e.g., traffic that cannot be routed in the solution under either normal or failure conditions. Topology computation module 58 accumulates the penalties applied to a solution and adds the accumulated total penalty cost to the total resource cost to determine a total cost for the solution (810).

For the initial run (iteration) of the optimization algorithm (YES branch of 812), topology computation module 58 does not perform a comparison with a previous solution but instead modifies the network topology (814). To modify the network topology of network 6, topology computation module 58 may either (1) select one of the filtered candidate links to block by adding a high (but not infinite) penalty to the routing metric on the filtered candidate link, (2) select a filtered candidate link that had been previously blocked to 'unblock' by removing a penalty previously applied on the routing metric for the selected filtered candidate link, or (3) (in some cases) routing the link on a different path in the transport layer such that the new path changes the shared-risk-groups encountered by the link in the logical network layer and the capacity requirements in the transport network 54. Topology computation module 58 may choose between blocking or unblocking and select a link according to a random function. Topology computation module 58 in some cases, however, may apply simple heuristics such as biasing more expensive links toward blocking and less expensive links toward unblocking, by biasing more toward blocking links that have very low traffic on them [e.g., a very low ratio (traffic carried)/(link cost)] and towards unblocking shorter links on busy node, or by biasing the selection such that active links that are on shared resource constraints at or above their constrained capacity may be preferentially selected for blocking Having modified the network topology for purposes of the algorithm, topology computation module 58 applies steps 806, 806, 808, and 810 to determine a new solution of filtered candidate links having newly routed traffic and to determine a total cost for the new solution. This is a subsequent iteration (NO branch of 812). Topology computation module 58 compares the total cost for the new solution with the total cost for the previous solution (820), and if the total cost has been reduced with the new solution (YES branch of 820), topology computation module 58 accepts the modified network topology and proceeds to step 814. If however the total cost has not been reduced with the new solution (NO branch of 820), topology computation module 58 applies a simulated annealing function to determine whether to accept the modified network topology despite the modified network topology leading to a larger total cost (822). In this way, topology computation module 58 may facilitate avoiding local minima of the total cost gradient to progress the solutions to a more globally-optimal solution. The simulated annealing function is a function that returns a positive result according to probability dependent on the magnitude of the cost increase and the iteration progress of the operation 800 (e.g., the number of iterations). As one example, the probability for the function may be defined as:

$$\exp\left(-\frac{\Delta C}{T}\right),$$

where ΔC is the magnitude of the cost increase vis-à-vis the previous solution and T is a "temperature" parameter that topology computation module 58 generally but not exclusively reduces as the number of iterations increases. If the simulated annealing function returns a positive result (YES branch of 822), topology computation module 58 proceeds to step 814. If the simulated annealing function returns true (NO branch of 822), which is typically more likely, topology computation module 58 rejects the modified network topology and restores the network topology determined for the previous iteration (824). In this way, topology computation module 58 may effectively jump out of a local minima.

At step 814, topology computation module 58 modifies the network topology by blocking or unblocking one or more filtered candidate links as described above (814). If the number of iterations to be performed has not been reached (NO branch of 816), topology computation module 58 modifies the temperature parameter for the simulated annealing function applied in step 222 (818). This reduction may be proportional to the number of iterations, based on configurable thresholds for the number of iterations, or some other scheme. Parameter T may be user-configurable or dependent on some aspect of the computation, such as the number of filtered candidate links, or other aspect. To facilitate a global optimum algorithm, topology computation module 58 should spend as much time as possible in the temperature region where a reasonable percentage of the changes will increase the cost and then gradually reduce this percentage. As one example for determining T, at the start of the operation 800 topology computation module 58 sets a target percentage to 10% such that 10% of network topology modifications result in a cost increase. At the end the target percentage is set to 0%. During the iteration the target percentage is reduced linearly as the iteration progresses. For instance, every N iterations, topology computation module 58 will check the actual percentage of changes that increase the cost and check this against the target value. If the actual percentage is too high, then topology computation module 58 will decrease the parameter T. If this actual percentage is too low then topology computation module 58 will increase the parameter T. Example intermediate and final results of this process are depicted in FIGS. 7-9, above.

Once the iteration loop limit has been reached and the number of iterations to be performed are performed (YES of 816), topology computation module 58 exits the operation. In some cases, the iteration complete check of step 816 is based on other acceptance criteria, such as iterating: for a fixed elapsed time, until the total resource costs are less than some acceptable value, or until some other acceptance criteria is met. During the run of operation 800, topology computation module 58 stores the solution for the lowest-cost solution identified during any of the iterations. While the lowest-cost solution identified during operation 800 may not be globally optimal, the solution may nevertheless be optimized versus the initial determination or at least in some instances versus a solution that can be obtained in practice by alternative methods. Topology provisioning module 26 outputs the topology data determined for the solution, which may include the selected filtered candidate links, to the transport layer to set up the selected filtered candidate links to establish the determined network 6 topology (826). For example, topology provisioning module 26 may place the wavelengths from the network layer links on the network, as well as assign wavelengths, amplifiers, transponders, filters, and other optical equipment for switching and facilitating an optical path for optical signals for a link (828).

In some examples of operation 800, topology computation module 58 of a network management system outputs the topology data determined for the solution to a network operator via an interface, by outputting a file, or otherwise presenting the topology data for use by the network operator. In such examples, the management device may not provision the multi-layer network 60.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset.

Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   obtaining, by a management device of a multi-layer network comprising a network layer and an underlying transport layer, data describing a plurality of candidate links available for use as network links in network topologies for the network layer, wherein each candidate link of the plurality of candidate links is associated with an optical path in the transport layer;
   filtering, by the management device based at least on optical network data that describes optical characteristics of fibre links of the transport layer, the plurality of candidate links by determining a plurality of filtered candidate links, from the plurality of candidate links, that are each associated with an optical path in the transport layer that is a feasible optical path for optical transport;
   determining, by the management device after filtering the plurality of candidate links by determining a plurality of filtered candidate links, a first solution comprising a network topology for the network layer that includes a first selected subset of the filtered candidate links;
   determining, by the management device after generating a modified network topology based at least on the network topology, a second solution comprising the modified network topology for the network layer that includes a second selected subset of the filtered candidate links; and
   outputting, by the management device, topology data for one of the first solution or the second solution having a lowest total cost, the lowest total cost including a total resource cost to the network for the one of the first solution or the second solution.

2. The method of claim 1, further comprising:
   obtaining, by the management device, abstract link data describing at least one of the plurality of filtered candidate links,
   where determining the first solution comprises determining, by the management device based on the abstract link data, the network topology for the network layer that includes the first selected subset of the filtered candidate links.

3. The method of claim 2,
   wherein the abstract link data indicates at least one Shared Risk Link Group for the at least one of the plurality of filtered candidate links,
   wherein determining the second solution comprises determining, by the management device based at least on the network topology and the at least one Shared Risk Link Group for the at least one of the plurality of filtered candidate links, the second solution by applying a penalty cost to a first filtered candidate link and a second filtered candidate link of the second subset of the plurality of filtered candidate links, and
   wherein the lowest total cost of the second solution includes the penalty cost.

4. The method of claim 2, wherein obtaining abstract link data comprises receiving, by the management device, an abstract link data structure for the transport layer, the abstract link data structure including the abstract link data.

5. The method of claim 4, wherein receiving the abstract link data structure comprises receiving, by the management device from a network management system that manages a transport network that implements the transport layer, the abstract link data structure.

6. The method of claim 1, further comprising:
   routing, by the management device, a plurality of traffic demands to the network topology, each traffic demand of the plurality of traffic demands representing an end-to-end traffic flow for the network layer.

7. The method of claim 6, further comprising:
   determining, by the management device, the first selected subset of the filtered candidate links by selecting filtered candidate links on which the management device has routed a traffic demand of the plurality of traffic demands.

8. The method of claim 1, wherein the modified network topology comprises a first modified network topology, the method further comprising:
   determining, by the management device after generating a second modified network topology based on the first modified network topology and in response to determining that the second solution has a lower total cost than the first solution, a third solution comprising the second modified network topology for the network layer that includes a third selected subset of the filtered candidate links; and
   determining, by the management device after generating a third modified network topology based on the network topology in response to determining that the second solution has a higher total cost than the first solution, a fourth solution comprising the third modified network topology for the network layer that includes a third selected subset of the filtered candidate links.

9. The method of claim 1, further comprising:
  determining, by the management device, a magnitude of a total cost increase for the second solution from the first solution; and
  determining, by the management device, a result of a simulated annealing function based on the magnitude of the total cost increase and a temperature parameter.

10. The method of claim 9, further comprising:
  setting, by the management device, the temperature parameter according to a target probability for the simulated annealing function, the target probability being a probability that a total cost for the second solution from the first solution increases.

11. The method of claim 1, wherein the modified network topology comprises a first modified network topology, the method further comprising:
  determining, by the management device, a magnitude of a total cost increase for the second solution from the first solution;
  determining, by the management device, a result of a simulated annealing function based on the magnitude of the total cost increase and a temperature parameter;
  determining, by the management device after generating a second modified network topology based on the first modified network topology and in response to determining that the second solution has a lower total cost than the first solution and only if the result of the simulated annealing function is positive, a third solution comprising the second modified network topology for the network layer that includes a third selected subset of the filtered candidate links; and
  determining, by the management device after generating a third modified network topology based on the network topology in response to determining that the second solution has a higher total cost than the first solution and only if the result of the simulated annealing function is negative, a fourth solution comprising the third modified network topology for the network layer that includes a third selected subset of the filtered candidate links.

12. The method of claim 1, further comprising:
  routing, by the management device, a plurality of traffic demands to the network topology, each traffic demand of the plurality of traffic demands representing an end-to-end traffic flow mapped to a label-switched path for the network layer.

13. The method of claim 1, further comprising:
  determining a first candidate link of the plurality of candidate links is associated with a first optical path in the transport layer that is a feasible optical path for optical transport by determining a first impairment to the first optical path for the first candidate link and determining, in response to determining an optical node that terminates the first optical path includes an optical receiver that is available and able to tolerate the first impairment; and
  determining a second candidate link of the plurality of candidate links is associated with a second optical path in the transport layer that is not a feasible optical path for optical transport by determining a second impairment to the second optical path for the second candidate link and determining an optical node that terminates the second optical path does not include an optical receiver that is available and able to tolerate the second impairment.

14. The method of claim 13, wherein the first impairment comprises at least one of polarization mode dispersion, polarization dependent loss, and chromatic dispersion.

15. The method of claim 1, further comprising:
  determining a first candidate link of the plurality of candidate links is associated with a first optical path in the transport layer that is a feasible optical path for optical transport by determining an aggregate optical signal-to-noise ratio (OSNR) for the first optical path for the first candidate link and determining an optical node that terminates the first optical path includes an optical receiver that is available and able to receive an optical signal having the aggregate OSNR; and
  determining a second candidate link of the plurality of candidate links is associated with a second optical path in the transport layer that is not a feasible optical path for optical transport by determining an aggregate OSNR for the second optical path for the second candidate link and determining an optical node that terminates the second optical path does not include an optical receiver that is available and able to receive an optical signal having the aggregate OSNR.

16. The method of claim 1, further comprising:
  determining, by the management device, one or more optical paths in the transport layer to underlie a network link that connects a pair of routers in the network layer; and
  generating, by the management device, candidate links of the plurality of candidate links that are each defined at least in part by an optical path of the one or more optical paths and the pair of routers.

17. A management device for a multi-layer network comprising a network layer and an underlying transport layer, the management device comprising:
  one or more processors coupled to a memory; and
  a topology computation module configured for execution by the one or more processors to:
  obtain data describing a plurality of candidate links available for use as network links in network topologies for the network layer, wherein each candidate link of the plurality of candidate links is associated with an optical path in the transport layer;
  filter, based at least on optical network data that describes optical characteristics of fibre links of the transport layer, the plurality of candidate links by determining a plurality of filtered candidate links, from the plurality of candidate links, that are each associated with an optical path in the transport layer that is a feasible optical path for optical transport;
  determine a plurality of filtered candidate links comprising each candidate link determined to have a feasible optical path;
  determine, after filtering the plurality of candidate links by determining a plurality of filtered candidate links, a first solution comprising a network topology for the network layer that includes a first selected subset of the filtered candidate links; and
  determine, after generating a modified network topology based at least on the network topology, a second solution comprising the modified network topology for the network layer that includes a second selected subset of the filtered candidate links,
  wherein the one or more processors are configured to output, for configuring the multi-layer network, topology data for one of the first solution or the second solution having a lowest total cost, the lowest total cost including a total resource cost to the network for the one of the first solution or the second solution.

18. The management device of claim 17,
wherein the topology computation module is further configured to obtain abstract link data describing at least one of the plurality of filtered candidate links, and
wherein to determine the first solution the topology computation module is further configured to determine, based on the abstract link data, the network topology for the network layer that includes the first selected subset of the filtered candidate links.

19. The management device of claim 18,
wherein the abstract link data indicates at least one Shared Risk Link Group for the at least one of the plurality of filtered candidate links,
wherein to determine the second solution the topology computation module is further configured to determine, based at least on the network topology and the at least one Shared Risk Link Group for the at least one of the plurality of filtered candidate links, the second solution by applying a penalty cost to a first filtered candidate link and a second filtered candidate link of the second subset of the plurality of filtered candidate links, and
wherein the lowest total cost of the second solution includes the penalty cost.

20. The management device of claim 18, wherein to obtain abstract link data the topology computation module is further configured to receive an abstract link data structure for the transport layer, the abstract link data structure including the abstract link data.

21. The management device of claim 20, wherein to receive the abstract link data structure the topology computation module is further configured to receive, from a network management system that manages a transport network that implements the transport layer, the abstract link data structure.

22. The management device of claim 17,
wherein the topology computation module is further configured to route a plurality of traffic demands to the network topology, each traffic demand of the plurality of traffic demands representing an end-to-end traffic flow for the network layer.

23. The management device of claim 22,
wherein the topology computation module is further configured to determine the first selected subset of the filtered candidate links by selecting filtered candidate links on which the management device has routed a traffic demand of the plurality of traffic demands.

24. The management device of claim 17,
wherein the modified network topology comprises a first modified network topology,
wherein the topology computation module is further configured to determine, after generating a second modified network topology based on the first modified network topology and in response to determining that the second solution has a lower total cost than the first solution, a third solution comprising the second modified network topology for the network layer that includes a third selected subset of the filtered candidate links, and
wherein the topology computation module is further configured to determine, after generating a third modified network topology based on the network topology in response to determining that the second solution has a higher total cost than the first solution, a fourth solution comprising the third modified network topology for the network layer that includes a third selected subset of the filtered candidate links.

25. The management device of claim 17,
wherein the topology computation module is further configured to determine a magnitude of a total cost increase for the second solution from the first solution, and
wherein the topology computation module is further configured to determine a result of a simulated annealing function based on the magnitude of the total cost increase and a temperature parameter.

26. The management device of claim 25,
wherein the topology computation module is further configured to set the temperature parameter according to a target probability for the simulated annealing function, the target probability being a probability that a total cost for the second solution from the first solution increases.

27. The management device of claim 17,
wherein the modified network topology comprises a first modified network topology,
wherein the topology computation module is further configured to determine a magnitude of a total cost increase for the second solution from the first solution,
wherein the topology computation module is further configured to determine a result of a simulated annealing function based on the magnitude of the total cost increase and a temperature parameter,
wherein the topology computation module is further configured to determine, after generating a second modified network topology based on the first modified network topology and in response to determining that the second solution has a lower total cost than the first solution and only if the result of the simulated annealing function is positive, a third solution comprising the second modified network topology for the network layer that includes a third selected subset of the filtered candidate links, and
wherein the topology computation module is further configured to determine, after generating a third modified network topology based on the network topology in response to determining that the second solution has a higher total cost than the first solution and only if the result of the simulated annealing function is negative, a fourth solution comprising the third modified network topology for the network layer that includes a third selected subset of the filtered candidate links.

28. The management device of claim 17,
wherein the topology computation module is further configured to route a plurality of traffic demands to the network topology, each traffic demand of the plurality of traffic demands representing an end-to-end traffic flow mapped to a label-switched path for the network layer.

29. The management device of claim 17, wherein the topology computation module is further configured to:
determine a first candidate link of the plurality of candidate links is associated with a first optical path in the transport layer that is a feasible optical path for optical transport by determining a first impairment to the first optical path for the first candidate link, and determine, in response to determining an optical node that terminates the first optical path includes an optical receiver that is available and able to tolerate the first impairment; and
determine a second candidate link of the plurality of candidate links is associated with a second optical path in the transport layer that is not a feasible optical path for optical transport by determining a second impairment to the second optical path for the second candidate link, and determine an optical node that terminates the second optical path does not include an optical receiver that is available and able to tolerate the second impairment.

30. The management device of claim 29, wherein the impairment comprises at least one of polarization mode dispersion, polarization dependent loss, and chromatic dispersion.

31. The management device of claim 17, wherein the topology computation module is further configured to:
    determine a first candidate link of the plurality of candidate links is associated with a first optical path in the transport layer that is a feasible optical path for optical transport by determining a first aggregate optical signal-to-noise ratio (OSNR) for the first optical path for the first candidate link and determining an optical node that terminates the first optical path includes an optical receiver that is available and able to receive an optical signal having the first aggregate OSNR; and
    determine a second candidate link of the plurality of candidate links is associated with a second optical path in the transport layer that is not a feasible optical path for optical transport by determining a second aggregate OSNR for the second optical path for the second candidate link and determining an optical node that terminates the second optical path does not include an optical receiver that is available and able to receive an optical signal having the second aggregate OSNR.

32. The management device of claim 17, wherein the topology computation module is further configured to:
    determine one or more optical paths in the transport layer to underlie a network link that connects a pair of routers in the network layer; and
    generate candidate links of the plurality of candidate links that are each defined at least in part by an optical path of the one or more optical paths and the pair of routers.

33. The management device of claim 17, further comprising:
    a topology provisioning module configured for execution by the one or more processors to output, for configuring the multi-layer network, the topology data.

34. A non-transitory computer-readable medium comprising instructions for causing one or more programmable processors of a management device of a multi-layer network comprising a network layer and an underlying transport layer to perform operations comprising:
    obtaining data describing a plurality of candidate links available for use as network links in network topologies for the network layer, wherein each candidate link of the plurality of candidate links is associated with an optical path in the transport layer;
    filtering, based at least on optical network data that describes optical characteristics of fibre links of the transport layer, the plurality of candidate links by determining a plurality of filtered candidate links, from the plurality of candidate links, that are each associated with an optical path in the transport layer that is a feasible optical path for optical transport;
    determining, after filtering the plurality of candidate links by determining a plurality of filtered candidate links, a first solution comprising a network topology for the network layer that includes a first selected subset of the filtered candidate links;
    determining, after generating a modified network topology based at least on the network topology, a second solution comprising the modified network topology for the network layer that includes a second selected subset of the filtered candidate links; and
    outputting topology data for one of the first solution or the second solution having a lowest total cost, the lowest total cost including a total resource cost to the network for the one of the first solution or the second solution.

\* \* \* \* \*